United States Patent
Oh

(10) Patent No.: US 9,890,916 B2
(45) Date of Patent: Feb. 13, 2018

(54) LAMP UNIT AND VEHICLE USING THE SAME

(71) Applicant: LG INNOTEK CO., LTD., Seoul (KR)

(72) Inventor: Nam Seok Oh, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/912,701

(22) Filed: Jun. 7, 2013

(65) Prior Publication Data

US 2013/0329445 A1    Dec. 12, 2013

(30) Foreign Application Priority Data

Jun. 8, 2012 (KR) .................. 10-2012-0061758
May 28, 2013 (KR) .................. 10-2013-0060599

(51) Int. Cl.

| F21S 8/10 | (2006.01) |
|---|---|
| B60Q 1/00 | (2006.01) |
| B60Q 1/26 | (2006.01) |
| F21S 4/22 | (2016.01) |

(52) U.S. Cl.
CPC ........... *F21S 48/11* (2013.01); *B60Q 1/0041* (2013.01); *B60Q 1/2607* (2013.01); *B60Q 1/2696* (2013.01); *F21S 4/22* (2016.01); *F21S 48/115* (2013.01); *F21S 48/1159* (2013.01); *F21S 48/215* (2013.01); *F21S 48/218* (2013.01); *F21S 48/232* (2013.01)

(58) Field of Classification Search
CPC .. B60Q 1/0058; B60Q 1/0029; B60Q 1/0041; B60Q 1/06; B60Q 1/072; F21S 4/005; F21S 4/006; F21S 4/007; F21Y 2105/10; F21Y 2107/70; G02F 1/133305

USPC ...... 362/192, 249.02–249.04, 494, 507, 509, 362/521–523, 525, 531–545
See application file for complete search history.

(56) References Cited

U.S. PATENT DOCUMENTS

| 3,780,462 A | | 12/1973 | Pregel et al. |
|---|---|---|---|
| 5,099,401 A | * | 3/1992 | Kondo et al. ................. 362/541 |
| 5,249,104 A | | 9/1993 | Mizobe |
| 5,404,282 A | * | 4/1995 | Klinke et al. ............ 362/249.06 |

(Continued)

FOREIGN PATENT DOCUMENTS

| CN | 102374465 | 3/2012 |
|---|---|---|
| CN | 102434835 | 5/2012 |

(Continued)

OTHER PUBLICATIONS

Derwent Abstract of JP 2010015910.*

(Continued)

*Primary Examiner* — Jong-Suk (James) Lee
*Assistant Examiner* — Zheng Song
(74) *Attorney, Agent, or Firm* — KED & Associates, LLP

(57) ABSTRACT

A lamp unit and a vehicle using the same are provided that include a substrate; and at least two light sources disposed on the substrate, wherein angles formed by a reference line and normal lines to the surface of the substrate, to which the at least two light sources are attached, are different from one another. The lamp unit and the vehicle using the same use a plurality of the light sources having different arrangement directions from a reference direction, so that it is possible to implement a surface light source by means of a small number of the light sources.

10 Claims, 29 Drawing Sheets

(56) References Cited

U.S. PATENT DOCUMENTS

| | | | |
|---|---|---|---|
| 5,436,809 A * | 7/1995 | Brassier et al. | 362/545 |
| 5,455,747 A | 10/1995 | Aoyama | |
| 5,490,049 A | 2/1996 | Montalan et al. | |
| 5,519,596 A * | 5/1996 | Woolverton | 362/249.01 |
| 5,724,108 A * | 3/1998 | Shibata | G02B 6/0053 349/62 |
| 6,299,337 B1* | 10/2001 | Bachl et al. | 362/545 |
| 6,543,923 B2 | 4/2003 | Tamai | 362/521 |
| 7,312,839 B2* | 12/2007 | Lee | G02B 6/0038 349/63 |
| 7,458,714 B2 | 12/2008 | Chang | |
| 7,478,913 B2 | 1/2009 | Epstein | |
| 7,708,438 B2 | 5/2010 | Yajima et al. | 362/494 |
| 7,806,508 B2 | 10/2010 | Lin | |
| 7,806,567 B2 | 10/2010 | Chan | |
| 2003/0147253 A1* | 8/2003 | Shy | 362/545 |
| 2004/0223327 A1* | 11/2004 | Kuan et al. | 362/249 |
| 2004/0223328 A1* | 11/2004 | Lee et al. | 362/249 |
| 2005/0195074 A1* | 9/2005 | Kano | 340/475 |
| 2005/0225994 A1 | 10/2005 | Barros et al. | |
| 2005/0237760 A1 | 10/2005 | Tsukamoto et al. | 362/545 |
| 2006/0092658 A1* | 5/2006 | Scholz | 362/545 |
| 2006/0133104 A1 | 6/2006 | Okubo et al. | |
| 2006/0262533 A1* | 11/2006 | Lin | F21S 2/005 362/249.01 |
| 2007/0201225 A1 | 8/2007 | Holder et al. | |
| 2008/0030994 A1 | 2/2008 | Chang | |
| 2009/0073709 A1* | 3/2009 | Yajima et al. | 362/494 |
| 2010/0008088 A1* | 1/2010 | Koizumi et al. | 362/235 |
| 2010/0157595 A1* | 6/2010 | Lin et al. | 362/235 |
| 2010/0214799 A1* | 8/2010 | Ohmi et al. | 362/545 |
| 2010/0232173 A1 | 9/2010 | Ohno et al. | |
| 2010/0277666 A1* | 11/2010 | Bertram et al. | 349/61 |
| 2010/0290241 A1 | 11/2010 | Tsukamoto | 362/519 |
| 2011/0063850 A1* | 3/2011 | Oide | F21K 9/00 362/296.01 |
| 2011/0170307 A1* | 7/2011 | Ishikawa et al. | 362/516 |
| 2011/0228536 A1 | 9/2011 | Im et al. | 362/249.06 |
| 2012/0039084 A1* | 2/2012 | Eckhardt et al. | 362/516 |
| 2012/0106187 A1 | 5/2012 | Uchida | |
| 2012/0182731 A1 | 7/2012 | Kretschmann et al. | 362/235 |
| 2012/0182755 A1* | 7/2012 | Wildner | 362/555 |
| 2012/0287628 A1* | 11/2012 | Markell | 362/235 |
| 2013/0201690 A1* | 8/2013 | Vissenberg | E04B 9/0464 362/296.07 |
| 2013/0201707 A1 | 8/2013 | Suzuki et al. | |
| 2013/0265791 A1* | 10/2013 | Dassanayake et al. | 362/520 |

FOREIGN PATENT DOCUMENTS

| | | | | |
|---|---|---|---|---|
| JP | 3143874 | | 8/2008 | |
| JP | 2010-015910 | | 1/2010 | |
| JP | 2010015910 | * | 1/2010 | F21S 8/10 |
| JP | 2012-074217 | | 4/2012 | |

OTHER PUBLICATIONS

English Machine Translation of JP 2010015910.*

United States Office Action dated Oct. 1, 2014 issued in U.S. Appl. No. 13/684,708.

U.S. Office Action issued in a co-pending U.S. Appl. No. 13/684,708 dated Mar. 19, 2015.

U.S. Office Action issued in a co-pending U.S. Appl. No. 13/739,188 dated Mar. 23, 2015.

U.S. Office Action for U.S. Appl. No. 13/739,188 dated Sep. 3, 2015.

Chinese Office Action dated Jul. 11, 2016 issued in Application No. 201310228382.9 (with English Translation).

Japanese Office Action dated Feb. 17, 2017, issued in Application No. 2013-120619.

* cited by examiner

LAMP UNIT AND VEHICLE USING THE SAME

CROSS-REFERENCE TO RELATED APPLICATION

The present application claims priority under 35 U.S.C. § 119(e) of Korean Patent Applications Nos. 10-2012-0061758 filed Jun. 8, 2012 and 10-2013-0060599 filed May 28, 2013 the subject matters of which are incorporated herein by reference.

BACKGROUND

Field

This embodiment relates to a lamp unit and a vehicle using the same.

Description of Related Art

In general, a lamp refers to an apparatus supplying or adjusting light for specific purposes. The light source of the lamp may include an incandescent bulb, a fluorescent lamp, a neon lamp and the like. Recently, a light emitting diode (LED) is used as the light source of the lamp.

The LED refers to a device for converting an electrical signal into an infrared ray or light by using compound semiconductor characteristics. Unlike the fluorescent lamp, the LED do not use harmful substances like mercury to cause less environmental pollution.

The LED has a lifespan longer than those of the incandescent bulb, the fluorescent lamp, the neon lamp and has low power consumption. Also, the LED may have an excellent visibility and less glare due to a high color temperature.

The lamp unit using the LED is widely employed thanks to the above-mentioned advantages. For example, the lamp unit using the LED is now used for a backlight, a display device, a lighting, a head lamp or the like.

The lamp unit using the LED is suitable to be used for a vehicle lamp due to the excellent visibility and less glare. This is because since a vehicle and/or the driving conditions of the vehicle can be recognized from the outside by use of the light emitted from the lamp unit, the excellent visibility and less glare make it possible for drivers of other vehicles and/or passengers to clearly identify the vehicle and/or the driving conditions of the vehicle.

In addition, consumers regard not only the performance but also the design of the vehicle as important factors for buying the vehicle. Thus, a variety of curved surfaces are applied to the appearance of the vehicle. Also, when the lamp unit is formed to have a curved surface, the curved surface of the lamp unit may correspond to the curved surface of the vehicle's appearance or the curved surface itself of the lamp unit may be applied to the appearance of the vehicle.

Meanwhile, in general, since the LED is formed on a substrate, it is very difficult for a LED lamp to have a curved surface. Therefore, many tiny LED lamps are used for the purpose of allowing the LED lamp to be applied to the curved surface. However, the increase of the number of the LEDs increases the power consumption, and a limit of the design change of the LED lamp may make it impossible to differentiate the design of the vehicle's lamp.

SUMMARY

One embodiment is a lamp unit including a substrate; and at least two light sources disposed on the substrate. Angles formed by a reference line and normal lines to the surface of the substrate, to which the at least two light sources are attached, are different from one another.

Another embodiment is a lamp unit including an optical system including a curved surface; and a light source module disposed apart from the optical system by a predetermined distance. The light source module includes: a substrate including a plurality of supporting portions and a connecting portion which connects the adjacent supporting portions and a light source disposed on the supporting portion. The supporting portion has a surface perpendicular to a normal line passing through any one point on a surface of the optical system. A length of at least any one normal line of normal lines corresponding to the supporting portions respectively is different from at least one of those of the others.

Another embodiment is a vehicle using a lamp unit. The lamp unit includes: a substrate including a plurality of supporting portions disposed corresponding to the light sources respectively and a connecting portion disposed between the adjacent supporting portions and at least two light sources disposed on the substrate. Angles formed by a reference line and normal lines to a surface of the substrate, to which the at least two light sources are attached, are different from one another.

DETAILED DESCRIPTION

Hereinafter, embodiments will be described in detail with reference to accompanying drawings. However, the accompanied drawings are provided only for more easily describing the embodiments. It is easily understood by those skilled in the art that the spirit and scope of embodiments are not limited to the scope of the accompanied drawings.

A criterion for "on" and "under" of each layer will be described based on the drawings. A thickness or size of each layer is magnified, omitted or schematically shown for the purpose of convenience and clearness of description. The size of each component does not necessarily mean its actual size.

A thickness or size of each layer is magnified, omitted or schematically shown for the purpose of convenience and clearness of description. The size of each component does not necessarily mean its actual size.

In description of embodiments, when it is mentioned that an element is formed "on" or "under" another element, it means that the mention includes a case where two elements are formed directly contacting with each other or are formed such that at least one separate element is interposed (indirectly) between the two elements. The "on" and "under" will be described to include the upward and downward directions based on one element.

Hereafter, detailed technical characteristics to be embodied will be described in detail with reference to the accompanying drawings.

Figure 1:
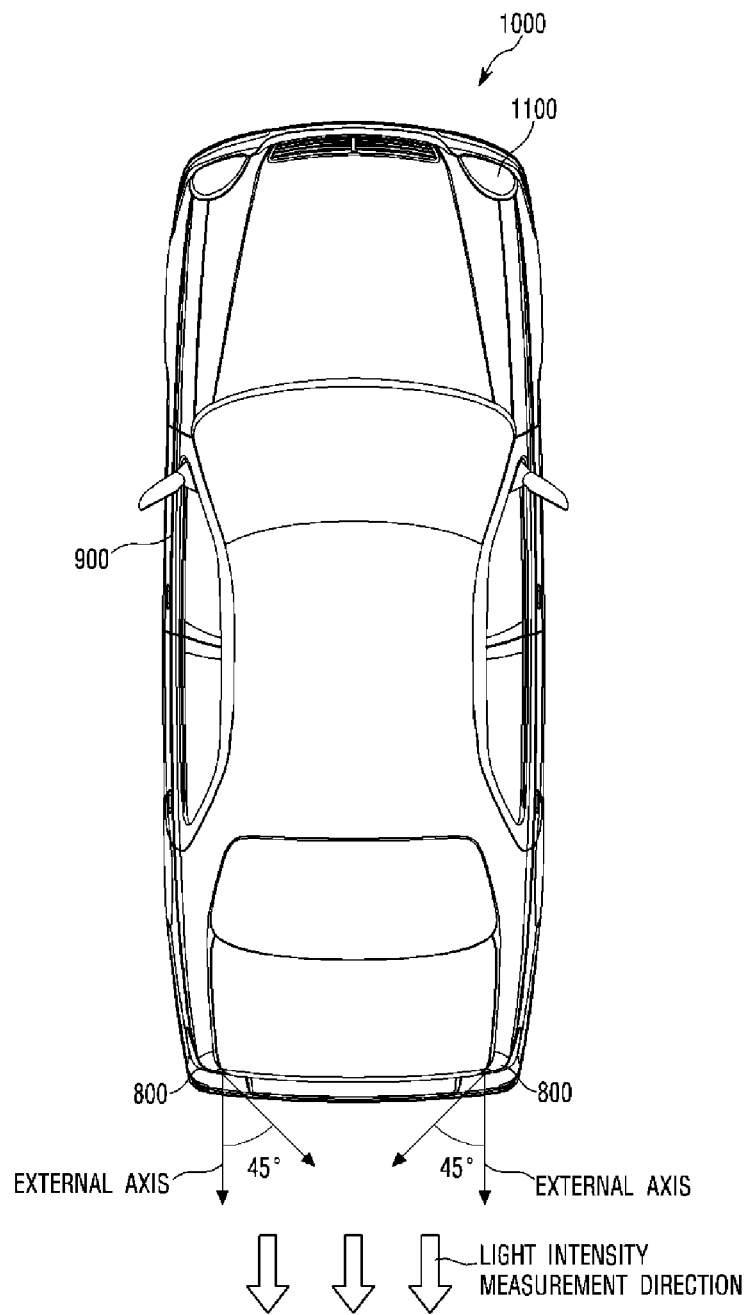
FIG. 1 is a plan view showing a vehicle including a lamp unit according to an embodiment.
Figure 2:
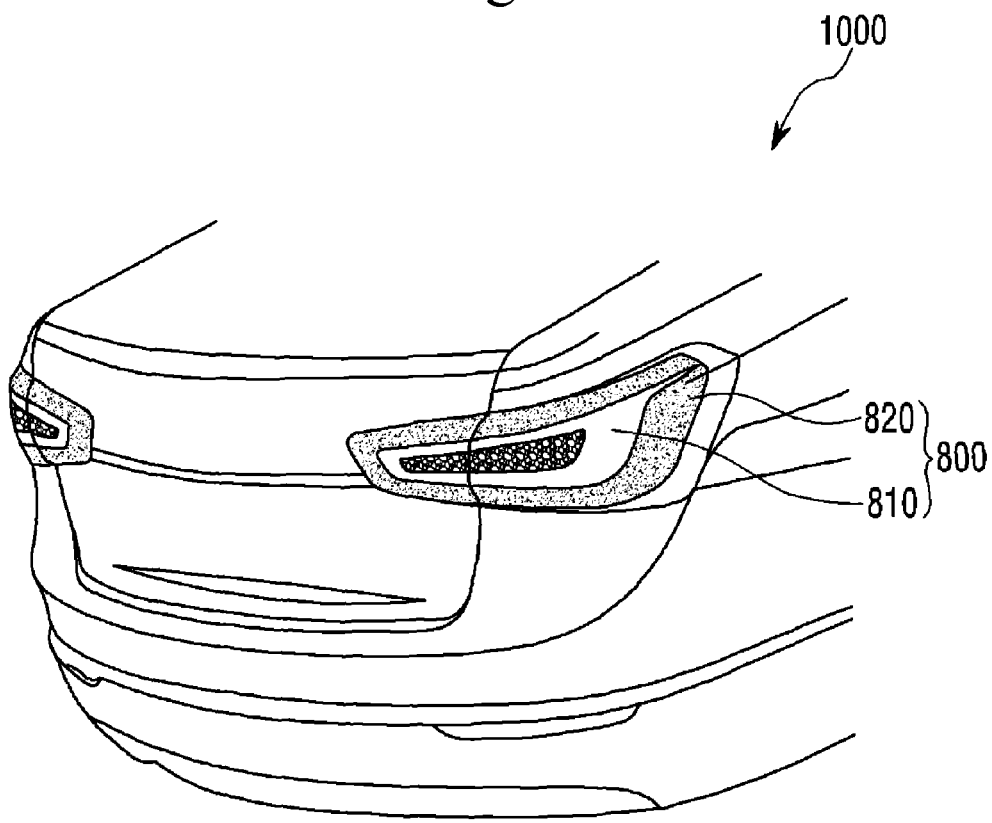
FIG. 2 is a perspective view as viewed from the rear lateral side of the vehicle shown in FIG. 1.
Figure 3:
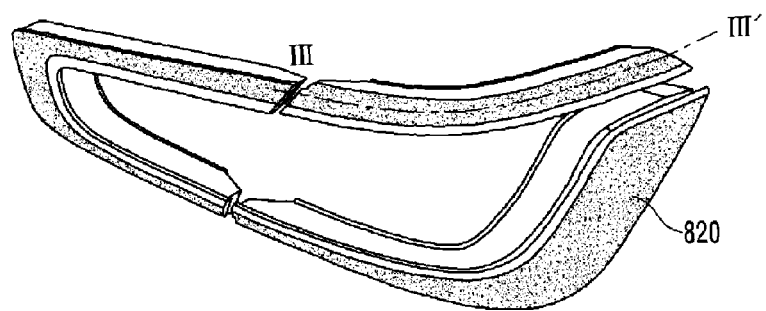
FIG. 3 is a perspective view showing a tail lamp unit to which a curved surface has been applied among tail lamp units shown in FIG. 2.
Figure 4:
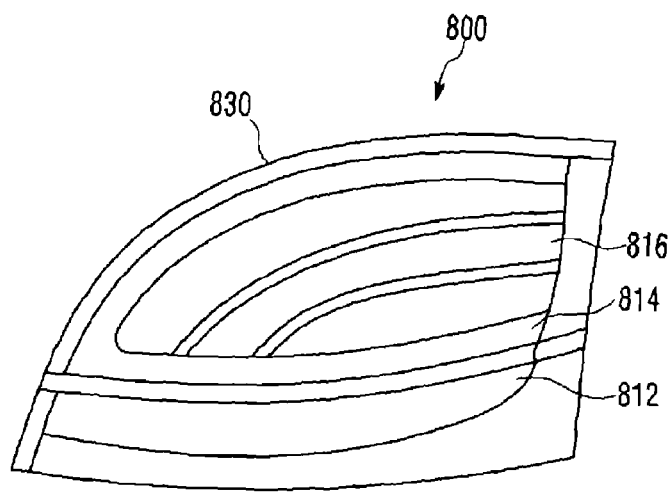
FIG. 4 is a view showing a tail lamp unit for a vehicle, which includes a lamp unit according to another embodiment.

FIG. 1 is a plan view showing a vehicle including a lamp unit according to an embodiment. FIG. 2 is a perspective view as viewed from the rear lateral side of the vehicle shown in FIG. 1. FIG. 3 is a perspective view showing a tail lamp unit to which a curved surface has been applied among tail lamp units shown in FIG. 2. FIG. 4 is a view showing a tail lamp unit for a vehicle, which includes a lamp unit according to another embodiment.

Referring to FIGS. 1 to 4, in general, a head lamp unit 1100 is disposed on the front side of a vehicle 1000, and a tail lamp unit 800 is disposed on the rear side of the vehicle 1000.

Each of the head lamp units 1100 and the tail lamp unit 800 of the vehicle 1000 may be disposed on a curved surface. Also, the tail lamp unit 800 includes a plurality of lamps and makes it possible for other drivers and/or pedestrians to know the information on the driving conditions of the vehicle, such as braking, reversing, right and left widths of the vehicle, a turn signal and the like by using the light emitting of each lamp.

As viewed from the external axis of the vehicle at a horizontal angle of 45 degree with respect to a central point, the tail lamp unit 800 should have a projection area greater than about 12.5 cm². For example, brightness for braking should be about 40 to 45 candela (cd) in order to meet safety standards. Therefore, when the light intensity of the tail lamp unit 800 is measured in a light intensity measurement direction, the tail lamp unit 800 should supply the light intensity greater than a standard value. However, the spirit of the embodiment is not limited to the safety standard for the tail lamp unit 800 and the required light intensity, and can be still applied even when the safety standard and the required light intensity are changed.

All of the tail lamp units 800 may have a curved surface. Otherwise, some of the tail lamp units 800 may have a curved surface and the others may not. Also, a lamp 810 disposed at the center of the tail lamp unit 800 may not have a curved surface, and a lamp 820 disposed on the outskirt of the tail lamp unit 800 may have a curved surface. However, there is no limit to this. The lamp 810 disposed at the center may have a curved surface, and a lamp 820 disposed on the outskirt may not. FIG. 3 FIG. 3 shows the lamp which is disposed on the outskirt of the tail lamp unit and has a curved surface.

As shown in FIG. 4, the tail lamp unit 800 for a vehicle may include a first lamp unit 812, a second lamp unit 814, a third lamp unit 816 and a housing 810.

Here, the first lamp unit 812 may be a light source functioning as a turn signal lamp. The second lamp unit 814 may be a light source functioning as a position lamp. The third lamp unit 816 may be a light source functioning as a stop lamp. However, they are not limited to this. Their functions may be interchanged with each other.

The housing 810 receives the first to the third lamp units 812, 814 and 816, and may be formed of a light-transmitting material.

Here, the housing 810 may be curved according to the design of the body of the vehicle. The first to the third lamp units 812, 814 and 816 are able to implement a surface light source which is curved according to the shape of the housing 810.

As such, according to the embodiment, a plurality of the light sources having different arrangement directions from the already set reference direction, and a light mixing area is formed in an empty space between the light source and an optical system. Accordingly, it is possible to implement the surface light source by means of a small number of the light sources and to provide light intensity and light amount which are suitable for safety standards for the vehicle lamp. As a result, the economical efficiency and design flexibility of the lamp unit can be enhanced.

With regard to the lamp units 800 and 1100 according to the embodiment, the surface light source capable of supplying the light intensity greater than a standard value in a light intensity measurement direction can be implemented only by using a small number of the light sources. Accordingly, the economical efficiency and design flexibility of the lamp units 800 and 1100 can be improved.

Figure 5:
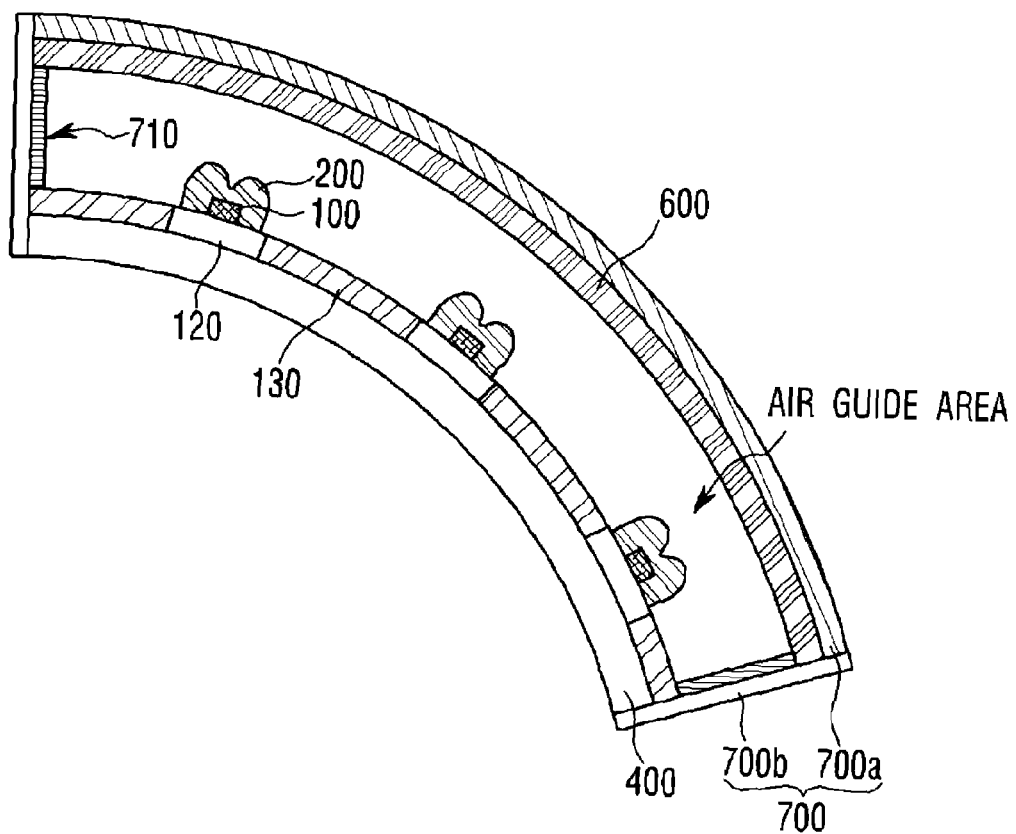
FIG. 5 is a cross sectional view of the tail lamp unit for a vehicle shown in FIG. 3, taken along III-III'.

FIG. 5 is a cross sectional view of the tail lamp unit for a vehicle shown in FIG. 3, taken along III-III'.

Referring to FIG. 5, the tail lamp unit according to the embodiment may include a light source module including a substrate 150 and a light source 110, an optical system 600, and a cover member 700.

Here, the light source module may include the substrate including electrode patterns, and a plurality of the light sources 110 disposed on the substrate 150. Here, while three light sources are shown, there is no limit to the number of the light sources 110.

The substrate 150 of the light source module may include a plurality of supporting portions 120 disposed corresponding to the light sources 110 respectively and may include a connecting portion 130 disposed between the adjacent supporting portions 120.

Here, the substrate 150 of the light source module may be manufactured to have flexibility. The substrate 150 may be a printed circuit board (PCB) substrate comprised of any one selected from the group consisting of polyethylene terephthalate (PET), glass, polycarbonate (PC), silicon (Si), polyimide, epoxy and the like, or may be formed in the form of a film.

Also, a single layer PCB, a multi layer PCB, a ceramic substrate, a metal core PCB, a flexible PCB (FPCB), etc., may be selectively and complexly used as the substrate 150 of the light source module.

Here, the entire area of the substrate 150 of the light source module may be comprised of one material. Otherwise, in some cases, a portion of the entire area of the substrate 150 may be comprised of another material different from the material.

For example, the supporting portion 120 and the connecting portion 130 of the substrate 150 may be formed of the same material. For example, the supporting portion 120 and the connecting portion 130 of the substrate 150 may include a base member and a circuit pattern disposed on at least one side of the base member. The material of the base member may be a film having flexibility and insulation, for example, polyimide or epoxy (e.g., FR-4).

The supporting portion 120 of the substrate 150 and the connecting portion 130 of the substrate 150 may be formed of mutually different materials.

In one embodiment, the supporting portion 120 of the substrate 150 may be a conductor, and the connecting portion 130 of the substrate 150 may be a nonconductor.

Also, the supporting portion 120 of the substrate 150 may be formed of a hard and unbendable material in order to support the light source 110, and the connecting portion 130 of the substrate 150 may be formed of a flexible and bendable material, so that the substrate 150 of the light source module can be manufactured to be applied to an object which has a curvature and is mounted on the substrate 150.

Also, any one of a reflective coating film and a reflective coating material layer may be formed on the surface of the substrate 150 of the light source module. The surface is capable of reflecting light generated by the light source 110 toward the optical system 600.

Here, the reflective coating film or the reflective coating material layer may be comprised of metal or metal oxide which has a high reflectance, for example, Al, Ag, Au, $TiO_2$ and the like.

In some cases, a plurality of heat radiating fins for radiating heat generated from the light source 110 may be disposed on the substrate 150 of the light source module.

For instance, the plurality of the heat radiating fins may be disposed on an entire area including the supporting portion 120 and the connecting portion 130 of the substrate 150, or may be disposed only on the supporting portion 120 of the substrate 150, which supports the light source 110.

The substrate 150 of the light source module may form a predetermined angle with a reference line. According to the embodiment, since the substrate 150 is flexible, angles formed by the reference line and normal lines to the surface of the substrate, to which at least two light sources are attached, may be different from one another. By doing this, from a structural point of view, the light source module can be easily installed on the curved surface which has a curvature, and optically uniform light can be generated.

For example, when the tail lamp unit 800 is applied to the curved surface of the vehicle, which has various curvatures, the surface of the substrate 150 of the light source module includes areas with various angles with respect to the reference line, and when the tail lamp unit 800 is applied to a flat object without curvature, the surface of the substrate 150 of the light source module includes only an area having a certain angle with respect to the reference line.

In this specification, the reference line refers to a line toward a reference direction. The reference direction includes an already set reference direction, a predetermined reference direction or an arbitrary reference direction. The already set reference direction or the predetermined reference direction includes a direction which is used to measure the amount or intensity of light generated from the plurality of the light sources 110. When an object to be applied requires predetermined conditions, for example, the amount or intensity of the light emitted in a particular direction, the already set reference direction or the predetermined reference direction includes the particular direction. For instance, when the already set reference direction or the predetermined reference direction includes predetermined conditions, such as the amount or intensity of the light emitted in a particular direction, the lamp unit may be designed according to the requirements. The predetermined reference direction may match the longitudinal direction of the vehicle. However, the reference direction is not limited to a particular direction and includes a randomly selected reference direction.

According to the safety standard for the tail lamp unit 800, as viewed from the external axis of the vehicle at a horizontal angle of 45 degree with respect to the central point of the tail lamp unit 800, the tail lamp unit 800 should have a projection area greater than about 12.5 cm². For example, the brightness for a brake lamp should be about 40 to 45 candela (cd). Therefore, according to the embodiment, the reference line may pass through the central point of the tail lamp unit 800.

Therefore, the entire design of the tail lamp unit 800 should be performed on the basis of the already set reference direction.

In the embodiment, the design may be performed such that the supporting portion 120 of the substrate 150 has a surface perpendicular to a normal line passing through any one point on the surface of the optical system 600, and the lengths of the normal lines corresponding to the supporting portions 120 of the substrates 150 respectively are the same as each other. That is, the distances between the optical system 600 and the supporting portions 120 may be the same as each other. Here, the distances may be physically and completely the same as each other or may be very similar to each other within an approximate range.

According to the embodiment, an angle formed by the normal lines to the substrates of the at least two light sources may be less than 90 degree. When an angle formed by the at least two normal lines is less than 90 degree, the at least two light sources are visible in the reference direction which matches the reference line, so that the light sources are capable of emitting a larger amount of light in the reference direction than the amount of light when the angle formed by the two normal lines is greater than 90 degree.

When the supporting portion 120 is flexible, an angle formed by the reference line and a normal line to the surface of the supporting portion 120, which corresponds to the center of the light source, may be less than 90 degree. If the angle formed by the normal line and the reference line is greater than 90 degree, the surface that the light source faces becomes perpendicular to the reference line, only a part of the light emitted from the light source is irradiated in a direction of the reference line. When only a part of the light is irradiated in the reference direction, the light intensity is measured in the reference direction, so that low intensity of the light is detected. Therefore, so as to meet the safety standard, the intensity of the light emitted from the light source should become much greater. As a result, power consumption is increased and glare is increased.

According to the embodiment, it may be designed such that the supporting portion 120 of the substrate 150 is disposed such that the normal line to the surface of the supporting portion 120, on which the light source 110 is disposed, forms a predetermined angle with the reference line facing toward the already set reference direction, and additionally it may be designed such that the light intensities of the light sources 110 disposed on the supporting portions 120 where the angle between the reference line and the normal line to the surface of the supporting portion 120 is from 0 to 45 degree are greater than the light intensities of the light sources 110 disposed on the supporting portions 120 where the angle between the reference line and the normal line to the surface of the supporting portion 120 is from 45.1 to 90 degree.

One embodiment of the design that the light intensities of the light sources 110 disposed on the supporting portions 120 where the angle between the reference line and the normal line to the surface of the supporting portion 120 is from 0 to 45 degree are greater than the light intensities of the light sources 110 disposed on the supporting portions 120 where the angle between the reference line and the normal line to the surface of the supporting portion 120 is from 45.1 to 90 degree is a design that densities of the light sources 110 disposed on the supporting portions 120 where the angle between the reference line and the normal line to the supporting portion 120 is from 0 to 45 degree are greater than the densities of the light sources 110 disposed on the supporting portions 120 where the angle between the reference line and the normal line to the supporting portion 120 is from 45.1 to 90 degree. Another embodiment may be a design that the supporting portion 120 of the substrate 150 is disposed such that the normal line to the surface of the supporting portion 120, on which the light source 110 is disposed, forms a predetermined angle with the reference line, and beam angle s of the light sources 110 disposed on the supporting portions 120 where the angle between the reference line and the normal line to the surface of the supporting portion 120 is from 0 to 45 degree are less than the beam angles of the light sources 110 disposed on the supporting portions 120 where the angle between the reference line and the normal line to the surface of the supporting portion 120 is from 45.1 to 90 degree. Also, further another embodiment may be a design that, through the combination of the densities and beam angles of the light sources 110, the light intensities of the light sources 110 disposed on the supporting portions 120 where the angle between the reference line and the normal line to the surface of the supporting portion 120 is from 0 to 45 degree are greater than the light intensities of the light sources 110 disposed on the supporting portions 120 where the angle between the reference line and the normal line to the surface of the supporting portion 120 is from 45.1 to 90 degree According to the embodiment, it may be designed such that the supporting portion 120 of the substrate 150 is disposed such that the normal line to the surface of the supporting portion 120, on which the light source 110 is disposed, forms a predetermined angle with the reference line, and additionally it may be designed such that the beam angles of the light sources 110 disposed on the supporting portions 120 where the angle between the reference line and the normal line to the surface of the supporting portion 120 is from 0 to 45 degree are less than the beam angles of the light sources 110 disposed on the supporting portions 120 where the angle between the reference line and the normal line to the surface of the supporting portion 120 is from 45.1 to 90 degree.

Next, the light source 110 of the light source module may be a top view type light emitting diode. When the light source 110 is the top view type light emitting diode, the light source 110 is able to obtain a desired light intensity only by a smaller number of the top view type light emitting diodes than that of the side view type light emitting diodes.

Here, the light source 110 of the light source module may be formed of a red LED chip, a blue LED chip or an ultraviolet ray LED chip, or may be formed in the form of a package obtained by combining at least one or more of a red LED chip, a green LED chip, a blue LED chip, a yellow green LED chip and a white LED chip.

The white LED chip can be implemented by combining a yellow phosphor on the blue LED chip, by simultaneously using a red phosphor and a green phosphor on the blue LED chip or simultaneously using the yellow phosphor, the red phosphor and the green phosphor on the blue LED chip.

In the embodiment, the lamp unit is applied to the tail lamp unit of the vehicle, the light source 110 of the light source module may be a vertical light emitting chip, for example, a red light emitting chip, and is not limited to this.

Subsequently, the light source 110 of the light source module may include a lens 200. The lens 200 may include a recess formed on a position corresponding to the central area of a light emitting surface of the light source 110.

A recess may be included on the lower surface of the lens 200, which corresponds to the light source 110.

Here, in the cross section of the recess may have a conical shape or a trapezoidal shape, of which the upper surface is large and the lower surface is small.

When the recess is formed on the lower surface of the lens 200, the recess may function as an incident portion of the light emitted from the light source, and the upper surface of the lens may function as an emitting portion of the light. The light emitted from the light source reaches the incident portion and is refracted by the refractive index and shape of the lens, and then passes through the emitting portion. According to the shape, size and structure of the lens, the light may be collected or diffused or field of view (light distribution) may be determined. As the light emitting surface of the lens is formed concavely or convexly or is formed to have at least one inflection point, it is possible to prevent the light from being excessively concentrated on the central portion of the lens (hot spot control) and to allow the light which has passed through the lens to have a wide beam angle.

That is, the surface area of the light emitting portion becomes greater than the surface area of the light incident portion, and there is an effect of diffusing the light. Also, through this, the lamp that meets a light distribution standard can be obtained even by using a small amount of the light sources.

As such, the recess is formed in the lens 200 in order to increase the beam angle of the light emitted from the light source 110. The embodiment is not limited to this and lenses having various shapes can be used in the embodiment.

The optical system 600 may be disposed apart from the substrate 150 by a predetermined distance. The light mixing area may be formed in the space between the substrate 150 and the optical system 600.

Here, without the cover member 700, the optical system 600 is able to function as the cover member 700.

In some cases, without the optical system 600, and only the cover member 700 may be provided.

The optical system 600 is comprised of at least one sheet. The optical system 600 may selectively include a diffusion sheet, a prism sheet and a brightness enhancement sheet, and the like.

Here, the diffusion sheet diffuses the light emitted from the light source 110. The prism sheet guides the diffused light to the light emitting area. The brightness enhancement sheet enhances the brightness.

For example, the diffusion sheet may be generally formed of an acrylic resin and is not limited to this. The diffusion sheet may be formed of a material capable of diffusing the light, for example, high transmissive plastic such as polystyrene (PS), polymethyl methacrylate (PMMA), circular olefin copolyester (COC), polyethylene terephthalate (PET) and resin.

The optical system 600 may have an unevenness pattern on the upper surface thereof.

The optical system 600 functions to diffuse the light emitted from the light source module. In order to increase the diffusion effect, the unevenness pattern may be formed on the upper surface.

In other words, the optical system 600 may be comprised of several layers. The unevenness pattern may be formed on the surface of the top layer or on the surface of any one layer.

The unevenness pattern may have a strip shape which is arranged in one direction.

Here, the unevenness pattern has a projection from the surface of the optical system 600. The projection has a first side and a second side, both of which face each other. An angle between the first side and the second side may be an obtuse angle or an acute angle.

In some cases, the optical system 600 may include at least two inclined surfaces having at least one inflection point.

Also, the optical system 600 may include a curved surface having at least one curvature. The optical system 600 can be hereby applied to the substrates having various curvatures, so that the optical system 600 having various shapes appropriate for the design of the vehicle can be applied.

Here, the optical system 600 may have a surface having at least any one of a concave curved surface, a convex curved surface and a flat in accordance with the external appearance of the cover member 700 or an object which is mounted on the optical system 600.

A normal line passing through any one point on the surface of the optical system 600 may be perpendicular to or almost perpendicular to the surface of the supporting portion 120 of the substrate 150. It may be designed that the lengths of all the normal lines corresponding to the supporting portions 120 of the substrates 150 respectively are the same as each other or similar to each other.

The normal line passing through any one point on the surface of the optical system 600 may be perpendicular to or almost perpendicular to the surface of the supporting portion 120 of the substrate 150. It may be designed that at least any one among the lengths of all the normal lines corresponding to the supporting portions 120 of the substrates 150 respectively is different from the others.

For example, when a vertical line passing through any one point of the surface of the supporting portion 120 of the substrate 150 passes through any one point of the optical system 600, a distance between the corresponding point of the optical system 600 and the surface of the supporting portion 120 may be greater than about 10 mm.

If the distance between the corresponding point of the optical system 600 and the surface of the supporting portion 120 is less than about 10 mm, the lamp unit does not have uniform luminance and a hot spot may occur where a strong luminance appears at an area where the light source 110 is located, or in contrast to this, a dark spot may occur where a relatively weak luminance appears.

A heat radiating member 400 may be disposed under the substrate 150 of the light source module.

Here, the heat radiating member 400 is able to outwardly radiate heat generated from the light source 110.

For example, the heat radiating member 400 may be formed of a material having a high thermal conductivity, e.g., aluminum, aluminum alloy, copper or copper alloy.

Metal core printed circuit board (MCPCB) obtained by integrally forming the heat radiating member 400 and the substrate 150 of the light source module may be provided. A separate heat radiating member 400 may be disposed on the lower surface of the MCPCB.

A separate heat radiating member 400 may be disposed on the lower surface of the MCPCB by means of an acrylic adhesive (not shown).

Generally, when the temperature of the light source 110 rises by the heat generated from the light source 110, the luminous intensity of the light source 110 is reduced and a wavelength shift of the generated light may occur.

Particularly, when the light source 110 is a red light emitting diode, the wavelength shift occurs excessively and the luminous intensity is excessively reduced.

However, when the heat radiating member 400 is disposed on the lower surface of the substrate 150 of the light source module, the heat generated from the light source 110 can be efficiently radiated to the outside, so that the temperature rise of the light source 110 can be suppressed. As a result, it is possible to prevent the luminous intensity of the light source 110 from being reduced and to prevent the wavelength shift of the light source 110 from occurring.

Next, the cover member 700 may include a top cover 700a and a side cover 700b. The top cover 700a may be formed of a light transmitting material. The side cover 700b may be formed of an opaque material.

In some cases, both the top cover 700a and the side cover 700b may be formed of a light transmitting material.

Here, the cover member 700 protects the light source module including the substrate 150 and the light source 110 from an external impact and may be formed of a material through which the light irradiated from the light source module transmits (for example, acryl).

The cover member 700 may include a curved portion in terms of design. Since the substrate 150 of the light source module is flexible, the substrate 150 can be easily received in the cover member 700.

Subsequently, a reflector 710 may be disposed on the inner surface of the side cover 700b of the cover member 700.

Here, any one of the reflective coating film and the reflective coating material layer may be formed on the reflector 710. The reflector 710 is capable of reflecting the light generated by the light source 110 toward the optical system 600.

Here, the reflector 710 may be comprised of metal or metal oxide which has a high reflectance, for example, Cr, Al, Ag, Au, $TiO_2$ and the like.

The cover member 700 is disposed to contact with the optical system 600. A portion of the cover member 700 may contact with the optical system 600, and the other portions may be disposed apart from the optical system 600 by a predetermined distance.

In some cases, the entire surface of the cover member 700, which faces the optical system 600, may contact with the optical system 600.

Also, the entire surface of the cover member 700, which faces the optical system 600, may be disposed apart from the optical system 600 by a predetermined distance.

For the purpose of providing an overall uniform luminance, the arrangement distance between the cover member 700 and the optical system 600 may be variously changed according to the design conditions of the light source module required by an object to be mounted.

As such, according to the embodiment, a plurality of the light sources having different arrangement directions from the already set reference direction, and the light mixing area is formed in an empty space between the light source and an optical system. Accordingly, it is possible to implement the surface light source by means of a small number of the light sources.

Here, the surface light source refers to a light source which diffuses light in the shape of a surface. In the embodiment, it is possible to provide the lamp unit capable of not only satisfying light intensity conditions emitted in a particular direction but also implementing the surface light source by means of a small number of the light sources.

Also, in the embodiment, since the plurality of the light sources can be disposed on the flexible substrate, the embodiment can be applied to objects to be mounted, which have a variety of shapes including the shape having a curvature.

Accordingly, through the embodiment, the economical efficiency and design flexibility of the lamp unit can be improved.

Figure 6:
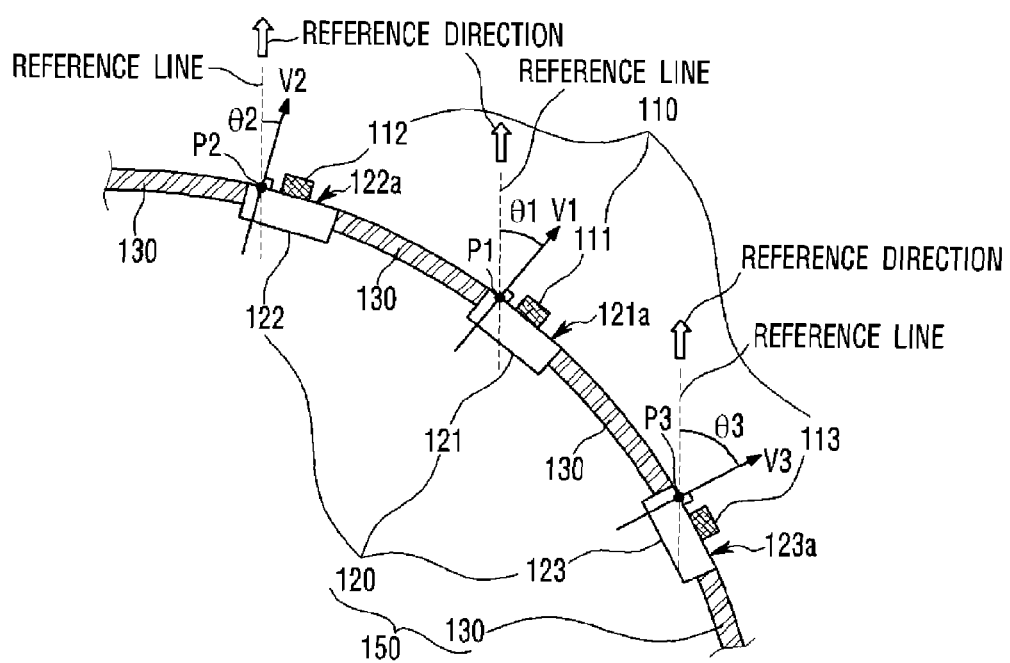
FIG. 6 is a cross sectional view showing the arrangement of light source modules according to a first embodiment.

FIG. 6 is a cross sectional view showing the arrangement of light source modules according to a first embodiment.

Referring to FIG. 6, the light source module may include the substrate 150 and the plurality of the light sources 110 disposed on the substrate 150.

Here, the substrate 150 may include a plurality of supporting portions 120 and the connecting portions 130. The supporting portions 120 may be disposed corresponding to the light sources 110 respectively, and the connecting portion 130 may be disposed between the adjacent supporting portions 120. The connecting portion 130 is flexible and can be implemented in various forms. The supporting portion 120 may be formed of a hard material to thereby stably support the light source.

The plurality of the supporting portions 120 may include a first supporting portion 121, a second supporting portion 122 and a third supporting portion 123. The second supporting portion 122 may be disposed on one side of the first supporting portion 121. The third supporting portion 123 may be disposed on the other side of the first supporting portion 121.

Here, the plurality of the light sources 110 may include a first light source 111, a second light source 112 and a third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction.

Here, the already set reference direction may mean a direction which is used to measure the amount or intensity of light generated from the plurality of the light sources 110.

The second supporting portion 122 may be disposed such that a second vertical line V2 passing through a second point P2 of the surface 122a of the second supporting portion 122, which faces the second light source 112, has a second angle of θ2 with respect to the reference line.

The third supporting portion 123 may be disposed such that a third vertical line V3 passing through a third point P3 of the surface 123a of the third supporting portion 123, which faces the third light source 113, has a third angle of θ3 with respect to the reference line.

Here, the first angle of θ1 may be different from at least any one of the second angle of θ2 and the third angle of θ3. That is, when the first angle of θ1 is different from at least any one of the second angle of θ2 and the third angle of θ3, the first to the third supporting portions 121 to 123 may be disposed on the curved surface, and thus, the substrate 150 comes to have a curved surface. Therefore, the substrate 150 can be applied to the curved surface of the vehicle.

For example, the first angle of θ1 may be greater than the second angle of θ2, and the first angle of θ1 may be less than the third angle of θ3.

Otherwise, the first angle of θ1 may be less than the second angle of θ2, and the first angle of θ1 may be greater than the third angle of θ3.

In some cases, the first angle of θ1 may be the same as at least any one of the second angle of θ2 and the third angle of θ3.

For example, the first angle of θ1 may be the same as the second angle of θ2 and may be less than the third angle of θ3.

Otherwise, the first angle of θ1 may be less than the first angle of θ1 and may be the same as the third angle of θ3.

As such, the supporting portion 120 of the substrate 150 may be disposed at a predetermined angle with respect to the reference line. For example, when the lamp unit is applied to an object having a curvature, the surface of the supporting portion 120 of the substrate 150 includes areas having various angles with respect to the reference line. When the lamp unit is applied to a flat object having no curvature, the surface of the supporting portion 120 of the substrate 150 includes areas having the same angle with respect to the reference line.

For example, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 cm$^2$. For example, the brightness for a brake lamp should be about 40 to 45 candela (cd).

Therefore, since the entire design of the light source module should be performed on the basis of the already set reference direction, the supporting portion 120 of the substrate 150 may be disposed at a predetermined angle with respect to the reference line facing toward the already set reference direction.

Figure 7A:
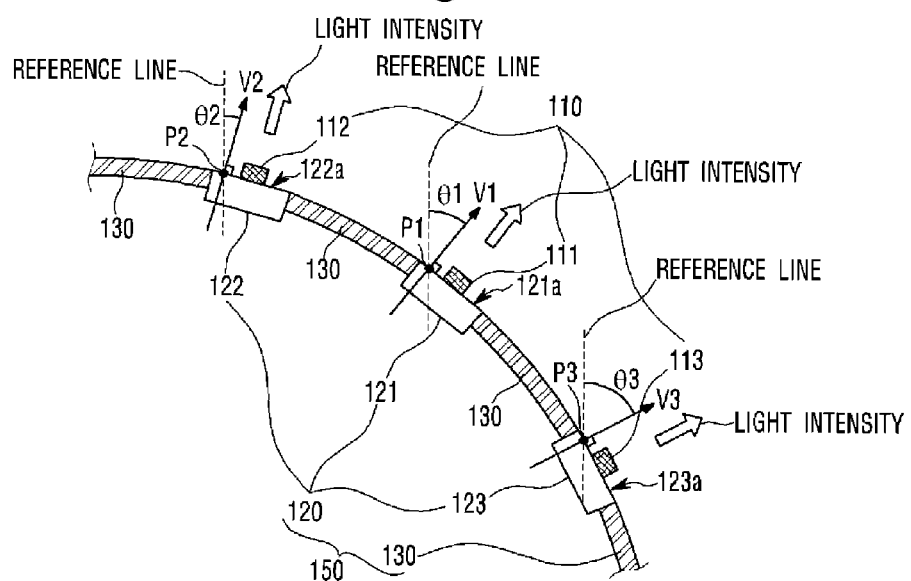
FIGS. 7a and 7b are cross sectional views showing the arrangement of the light source modules according to a second embodiment.
Figure 7B:
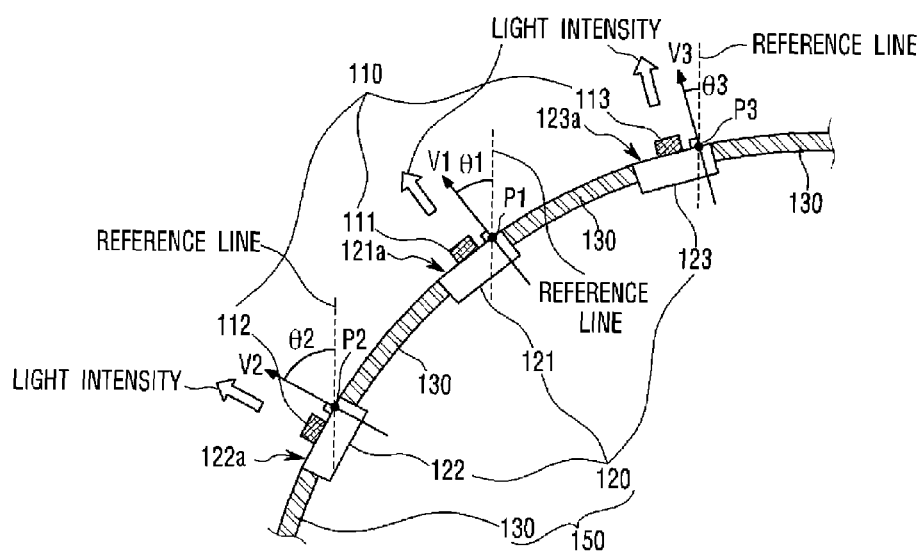

FIGS. 7a and 7b are cross sectional views showing the arrangement of the light source modules according to a second embodiment.

Referring to FIGS. 7a and 7b, the light source module may include the substrate 150 and the plurality of the light sources 110 disposed on the substrate 150.

Here, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Here, the plurality of the light sources 110 may include the first light source 111, the second light source 112 and the third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that the first vertical line V1 passing through the first point P1 of the surface 121a of the first supporting portion 121, which faces the first light source 111, has the first angle of θ1 with respect to the reference line facing toward the already set reference direction.

Here, the already set reference direction may mean a direction which is used to measure the amount or intensity of light generated from the plurality of the light sources 110.

The second supporting portion 122 may be disposed such that the second vertical line V2 passing through the second point P2 of the surface 122a of the second supporting portion 122, which faces the second light source 112, has the second angle of θ2 with respect to the reference line.

The third supporting portion 123 may be disposed such that the third vertical line V3 passing through the third point P3 of the surface 123a of the third supporting portion 123, which faces the third light source 113, has the third angle of θ3 with respect to the reference line.

Here, as shown in FIG. 7a, when the second angle of θ2 of the second supporting portion 122 is less than the first angle of θ1 of the first supporting portion 121 and the third angle of θ3 of the third supporting portion 123, the intensity of the light emitted from the second light source 112 supported by the second supporting portion 122 may be greater than the intensities of the lights emitted from the first light source 111 and the third light source 113.

Also, as shown in FIG. 7b, when the second angle of θ2 of the second supporting portion 122 is greater than the first angle of θ1 of the first supporting portion 121 and the third angle of θ3 of the third supporting portion 123, the intensity of the light emitted from the second light source 112 supported by the second supporting portion 122 may be less than the intensities of the lights emitted from the first light source 111 and the third light source 113.

For example, the intensity of the light emitted from the light sources 110 disposed on the supporting portions 120 where an angle between the reference line facing toward the already set reference direction and a vertical line passing through any one point of the surface of the supporting portion 120 facing the light source 110 is from about 0 to 45 degree may be greater than the intensity of the light emitted from the light sources 110 disposed on the supporting portions 120 where an angle between the reference line facing toward the already set reference direction and a vertical line passing through any one point of the surface of the supporting portion 120 facing the light source 110 is from about 45.1 to 90 degree.

As such, the supporting portion 120 of the substrate 150 may be disposed at a predetermined angle with respect to the reference line facing toward the already set reference direction. The light source 110 having higher light intensity may be disposed on the supporting portion 120 where the angle between the reference line and a vertical line passing through any one point of the surface of the supporting portion 120 is smaller. The light source 110 having lower light intensity may be disposed on the supporting portion 120 where the angle between the reference line and a vertical line passing through any one point of the surface of the supporting portion 120 is larger.

This intends to transfer a large amount of the light in the already set reference direction.

Here, the already set reference direction is a direction which is used to measure the amount or intensity of light generated from the plurality of the light sources 110. When an object to be applied requires predetermined conditions, for example, the amount or intensity of the light emitted in a particular direction, the light source 110 having different light intensity may be disposed according to the requirements.

For example, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 cm$^2$. For example, the brightness for a brake lamp should be about 40 to 45 candela (cd).

Accordingly, in the light source module, The light source 110 having higher light intensity is disposed on the supporting portion 120 where the angle between the reference line and a vertical line passing through any one point of the surface of the supporting portion 120 is smaller. The light source 110 having lower light intensity is disposed on the supporting portion 120 where the angle between the reference line and a vertical line passing through any one point of the surface of the supporting portion 120 is larger. As a result, the conditions, for example, the amount or intensity of the light can be satisfied in the already set reference direction.

Figure 8A:
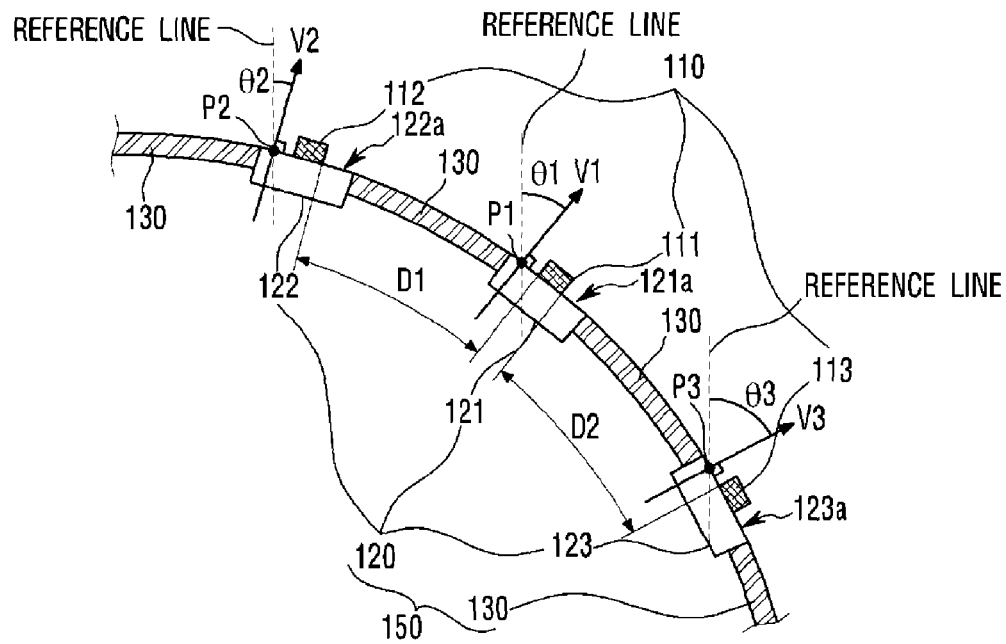
FIGS. 8a and 8b are cross sectional views showing the arrangement of the light source modules according to a third embodiment.
Figure 8B:
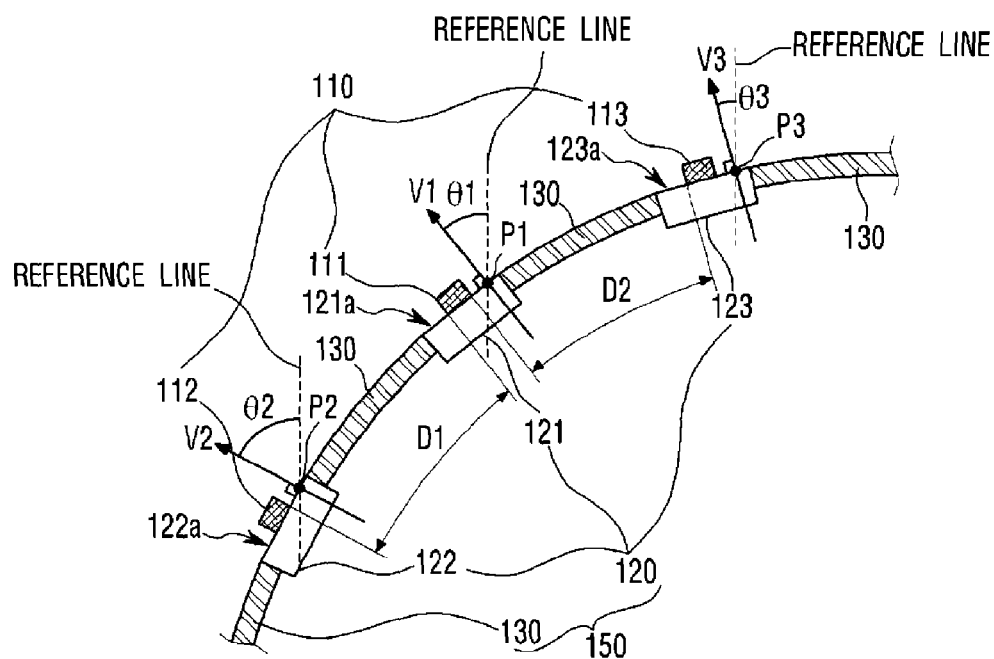

FIGS. 8a and 8b are cross sectional views showing the arrangement of the light source modules according to a third embodiment.

Referring to FIGS. 8a and 8b, the light source module may include the substrate 150 and the plurality of the light sources 110 disposed on the substrate 150.

Here, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Here, the plurality of the light sources 110 may include the first light source 111, the second light source 112 and the third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that the first vertical line V1 passing through the first point P1 of the surface 121a of the first supporting portion 121, which faces the first light source 111, has the first angle of θ1 with respect to the reference line facing toward the already set reference direction.

Here, the already set reference direction may mean a direction which is used to measure the amount or intensity of light generated from the plurality of the light sources 110.

The second supporting portion 122 may be disposed such that the second vertical line V2 passing through the second point P2 of the surface 122a of the second supporting portion 122, which faces the second light source 112, has the second angle of θ2 with respect to the reference line.

The third supporting portion 123 may be disposed such that the third vertical line V3 passing through the third point P3 of the surface 123a of the third supporting portion 123, which faces the third light source 113, has the third angle of θ3 with respect to the reference line.

Here, as shown in FIG. 8a, when the second angle of θ2 of the second supporting portion 122 is less than the first angle of θ1 of the first supporting portion 121 and the third angle of θ3 of the third supporting portion 123, a first distance D1 between the second light source 112 and the first light source 111 may be less than a second distance D2 between the first light source 111 and the third light source 113.

For example, a ratio of the first distance D1 between the second light source 112 and the first light source 111 to the second distance D2 between first light source 111 and the third light source 113 may be about 1:1.1 to 1:10. That is, the distance between the first light source 111 and the second light source 112 may be less than the distance between the second light source 112 and the third light source 113.

Here, the length of the connecting portion 130 connects the first supporting portion 121 and the second supporting portion 122 may be less than the length of the connecting portion 130 connects the first supporting portion 121 and the third supporting portion 123.

Also, as shown in FIG. 8b, when the second angle of θ2 of the second supporting portion 122 is greater than the first angle of θ1 of the first supporting portion 121 and the third angle of θ3 of the third supporting portion 123, the first distance D1 between the second light source 112 and the first light source 111 may be greater than the second distance D2 between the first light source 111 and the third light source 113.

For example, a ratio of the first distance D1 between the second light source 112 and the first light source 111 to the second distance D2 between first light source 111 and the third light source 113 may be about 1.1:1 to 10:1. That is, the distance between the first light source 111 and the second light source 112 may be greater than the distance between the second light source 112 and the third light source 113.

Here, the length of the connecting portion 130 connects the first supporting portion 121 and the second supporting portion 122 may be greater than the length of the connecting portion 130 connects the first supporting portion 121 and the third supporting portion 123.

That is, the densities of the light sources 110 disposed on the supporting portions 120 where an angle between the reference line facing toward the already set reference direction and a vertical line passing through any one point of the surface of the supporting portion 120 facing the light source 110 is from about 0 to 45 degree may be greater than the densities of the light sources 110 disposed on the supporting portions 120 where an angle between the reference line facing toward the already set reference direction and a vertical line passing through any one point of the surface of the supporting portion 120 facing the light source 110 is from about 45.1 to 90 degree.

As such, the supporting portion 120 of the substrate 150 may be disposed at a predetermined angle with respect to the reference line facing toward the already set reference direction. The light sources 110 disposed on the supporting portions 120 where the angle between the reference line and a vertical line passing through any one point of the surface of the supporting portion 120 is smaller may be disposed close to each other. The light sources 110 disposed on the supporting portions 120 where the angle between the reference line and a vertical line passing through any one point of the surface of the supporting portion 120 is larger may be disposed away from each other.

This intends to transfer a large amount of the light in the already set reference direction.

Here, the already set reference direction is a direction which is used to measure the amount or intensity of light generated from the plurality of the light sources 110. When an object to be applied requires predetermined conditions, for example, the amount or intensity of the light emitted in a particular direction, the densities of the light sources 110 may be disposed differently according to the requirements.

For example, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 cm². For example, the brightness for a brake lamp should be about 40 to 45 candela (cd).

Accordingly, in the light source module, the light sources 110 disposed on the supporting portions 120 where the angle between the reference line and a vertical line passing through any one point of the surface of the supporting portion 120 is smaller are disposed close to each other. The light sources 110 disposed on the supporting portions 120 where the angle between the reference line and a vertical line passing through any one point of the surface of the supporting portion 120 is larger are disposed away from each other. As a result, the conditions, for example, the amount or intensity of the light can be satisfied in the already set reference direction.

FIGS. 9a to 9d are cross sectional views showing how to measure the distance between the light sources.

Referring to FIGS. 9a to 9d, the light source module may include the substrate and the plurality of the light sources 110 disposed on the substrate.

Here, the substrate may include the plurality of supporting portions 120 and the connecting portions 130. The supporting portions 120 may be disposed corresponding to the light sources 110 respectively, and the connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Also, plurality of the light sources 110 may include the first light source 111, the second light source 112 and the third light source 113.

The first light source 111 may be supported by the first supporting portion 121. The second light source 112 may be supported by the second supporting portion 122. The third light source 113 may be supported by the third supporting portion 123.

The first light source 111 may include a side 111a and a side 111b, both of which face each other. The second light source 112 may include a side 112a and a side 112b, both of which face each other. The third light source 113 may include a side 113a and a side 113b, both of which face each other.

Here, the side 111b of the first light source 111 may face the side 112a of the second light source 112. The side 111a of the first light source 111 may face the side 113b of the third light source 113.

Figure 9A:
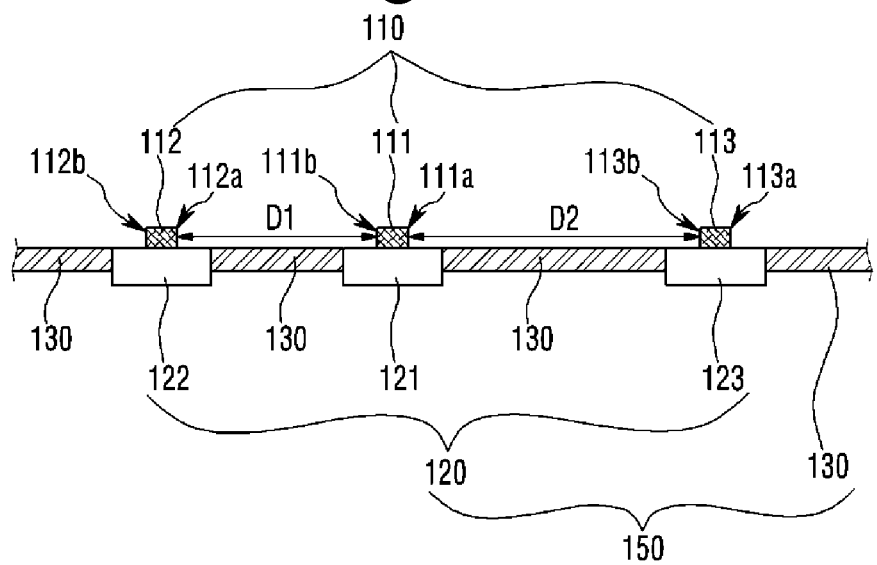
FIGS. 9a to 9d are cross sectional views showing how to measure the distance between the light sources.

Subsequently, as shown in FIG. 9a, when the second angle of θ2 of the second supporting portion 122 is less than the first angle of θ1 of the first supporting portion 121 and the third angle of θ3 of the third supporting portion 123, the first distance D1 between the second light source 112 and the first light source 111 may be less than the second distance D2 between the first light source 111 and the third light source 113.

Here, as shown in FIG. 9a, the first distance D1 may correspond to a distance between the side 111b of the first light source 111 and the side 112a of the second light source 112. The second distance D2 may correspond to a distance between the side 111a of the first light source 111 and the side 113b of the third light source 113.

Figure 9B:
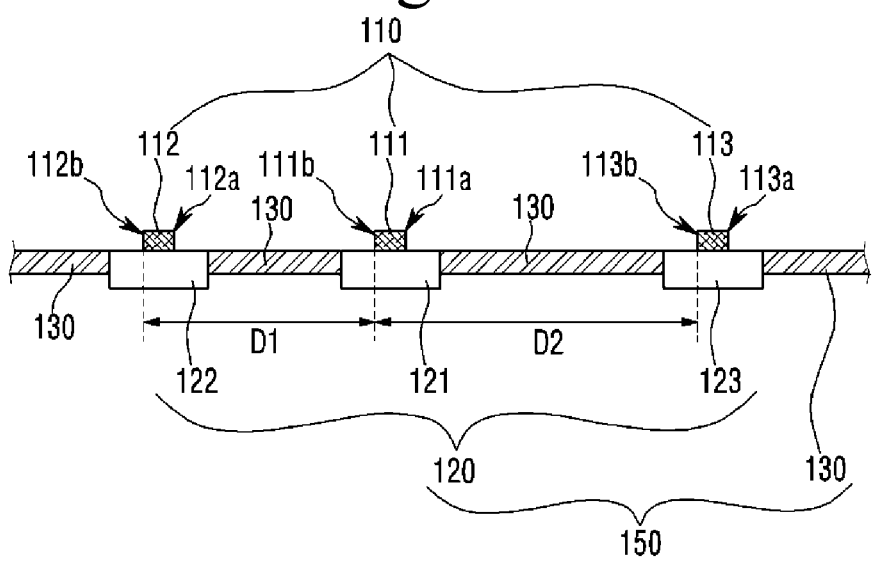

In some cases, as shown in FIG. 9b, the first distance D1 may correspond to a distance between the side 111b of the first light source 111 and the side 112b of the second light source 112. The second distance D2 may correspond to a distance between the side 111b of the first light source 111 and the side 113b of the third light source 113.

Figure 9C:
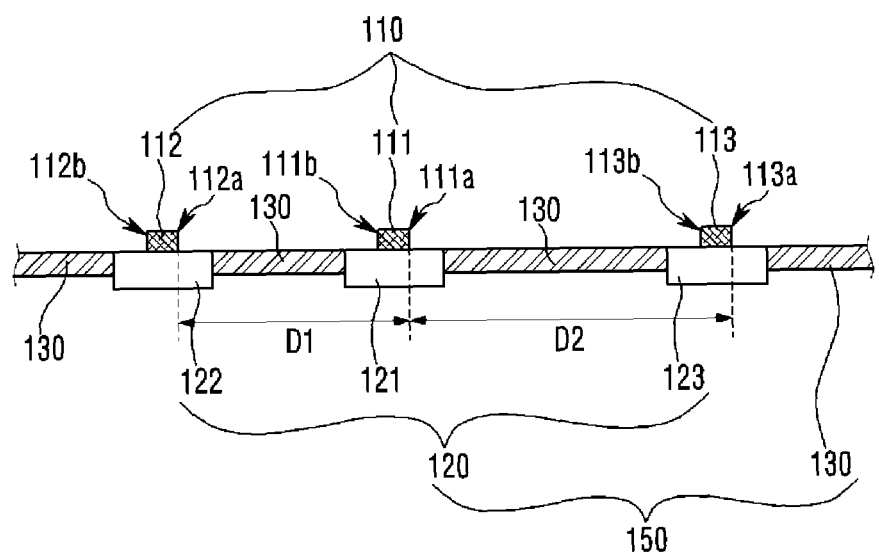

For another example, as shown in FIG. 9c, the first distance D1 may correspond to a distance between the side 111a of the first light source 111 and the side 112a of the second light source 112. The second distance D2 may correspond to a distance between the side 111a of the first light source 111 and the side 113a of the third light source 113.

Figure 9D:
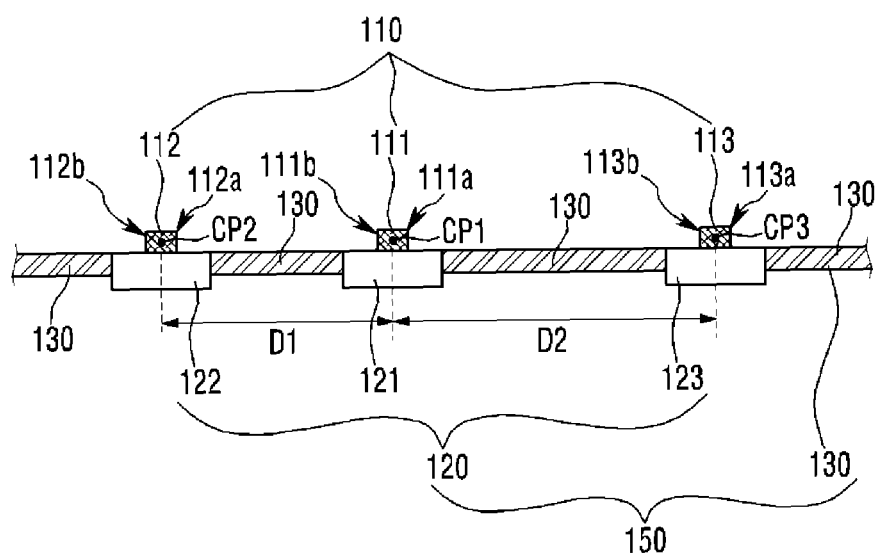

For another example, as shown in FIG. 9d, the first distance D1 may correspond to a distance between a central point 1 (CP1) of the first light source 111 and a central point 2 (CP2) of the second light source 112. The second distance D2 may correspond to a distance between the central point 1 (CP1) of the first light source 111 and a central point 3 (CP3) of the third light source.

As such, there are various method for measuring the first distance D1 and the second distance D2 because, when an object to be applied requires predetermined conditions, for example, the amount or intensity of the light emitted in a particular direction, the lamp unit should be designed according to the requirements.

Therefore, the entire design of the lamp unit should be performed on the basis of the already set reference direction.

FIGS. 10a to 10d are cross sectional views showing a supporting portion of a substrate.

Referring to FIGS. 10a to 10d, the light source module may include the substrate 150 and the plurality of the light sources 110 disposed on the substrate 150.

Also, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

Figure 10A:
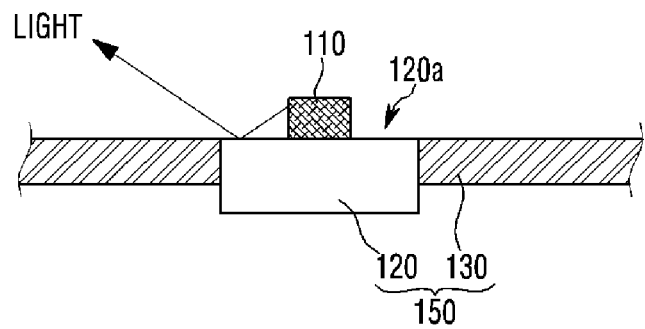
FIGS. 10a to 10d are cross sectional views showing a supporting portion of a substrate.

Here, as shown in FIG. 10a, according to the embodiment, the supporting portion 120 corresponding to the light source 110 is formed in such a manner as to support the light source 110. The supporting portion 120 may be disposed to face the light source 110. The surface 120a of the supporting portion 120 may be flat.

Figure 10B:
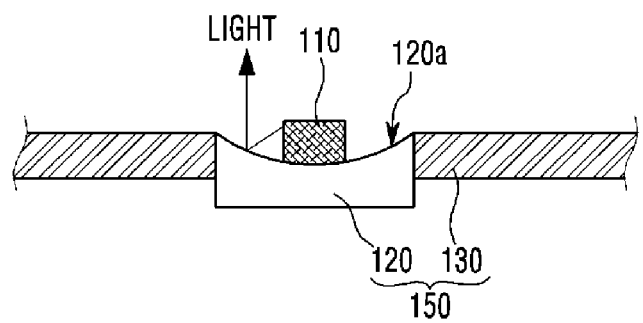
Figure 10C:
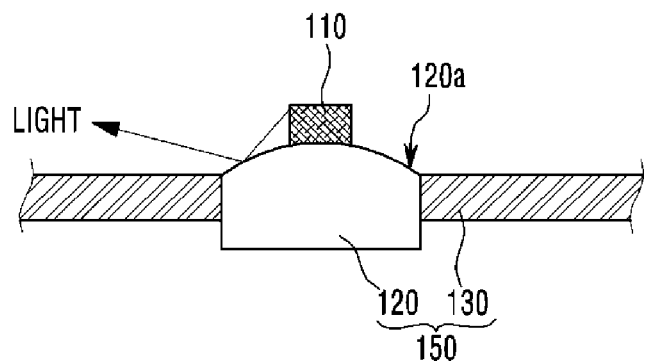

According to another embodiment, as shown in FIG. 10b, the surface 120a of the supporting portion 120 corresponding to the light source 110 may be a concave surface. As shown in FIG. 10c, the surface 120a of the supporting portion 120 corresponding to the light source 110 may be a convex surface.

Figure 10D:
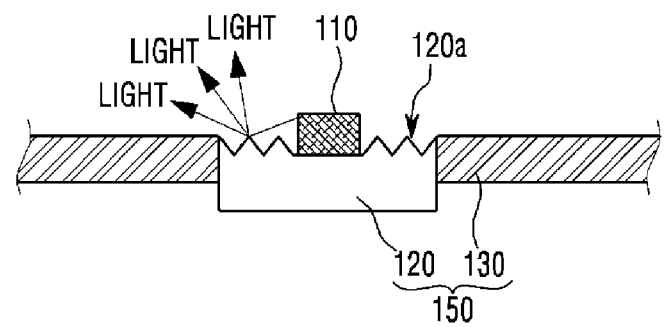

According to another embodiment, as shown in FIG. 10d, the surface 120a of the supporting portion 120 facing the light source 110 may have an unevenness pattern.

As shown in FIGS. 10a to 10d, it is possible to change the path of the light reflected by the supporting portion 120 by changing the shape of the supporting portion 120.

Also, any one of the reflective coating film and the reflective coating material layer may be formed on the supporting portion 120 of the substrate 150. The supporting portion 120 of the substrate 150 is capable of reflecting the light generated by the light source 110 toward the optical system 600.

Here, the reflective coating film or the reflective coating material layer may be comprised of metal or metal oxide which has a high reflectance, for example, Cr, Al, Ag, Au, $TiO_2$ and the like.

As such, for the purpose of providing an overall uniform luminance, the surface shape of the supporting portion 120 of the substrate 150 may be changed according to the design conditions of the light source module required by an object to be mounted and the embodiment.

FIGS. 11a to 11d are cross sectional views showing a connecting portion of the substrate.

Referring to FIGS. 11a to 11d, the light source module may include the substrate 150 and the plurality of the light sources 110 disposed on the substrate 150.

Also, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

Figure 11A:
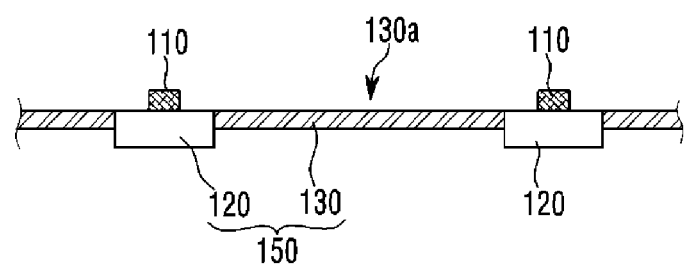
FIGS. 11a to 11d are cross sectional views showing a connecting portion of the substrate.

Here, as shown in FIG. 11a, the surface 130a of the connecting portion 130 disposed between the adjacent supporting portions 120 may be flat.

Figure 11B:
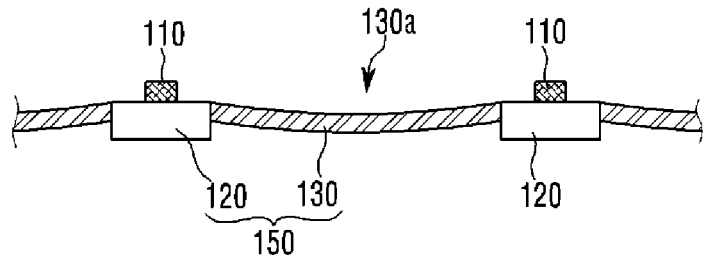
Figure 11C:
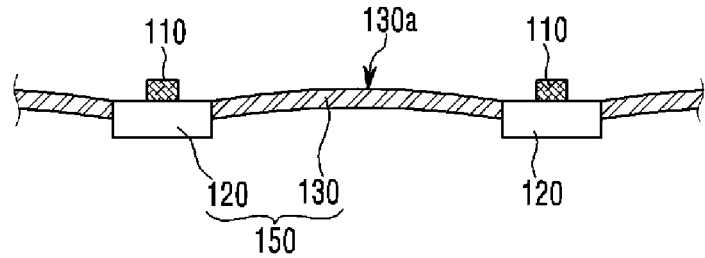

In some cases, as shown in FIG. 11b, the surface 130a of the connecting portion 130 disposed between the adjacent supporting portions 120 may be a concave surface. As shown in FIG. 11c, the surface 130a of the connecting portion 130 disposed between the adjacent supporting portions 120 may be a convex surface.

Figure 11D:
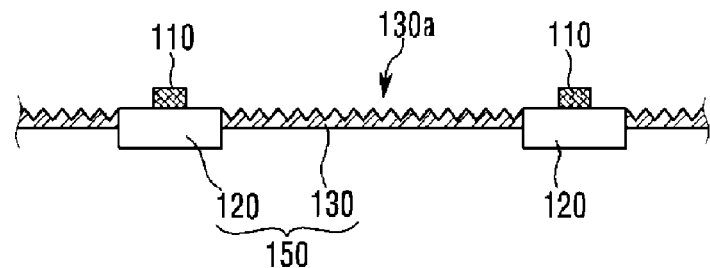

For another example, as shown in FIG. 11d, the surface 130a of the connecting portion 130 disposed between the adjacent supporting portions 120 may have an unevenness pattern. The path of the light reflected by the connecting portion 130 may be variously changed according to the unevenness pattern of the connecting portion 130.

Also, any one of the reflective coating film and the reflective coating material layer may be formed on the connecting portion 130 of the substrate 150. The connecting portion 130 is capable of reflecting the light generated by the light source 110 toward the optical system 600.

Here, the reflective coating film or the reflective coating material layer may be comprised of metal or metal oxide which has a high reflectance, for example, Cr, Al, Ag, Au, $TiO_2$ and the like.

As such, for the purpose of providing an overall uniform luminance, the surface shape of the connecting portion 130 of the substrate 150 may be variously changed according to the design conditions of the light source module required by an object to be mounted.

Figure 12A:
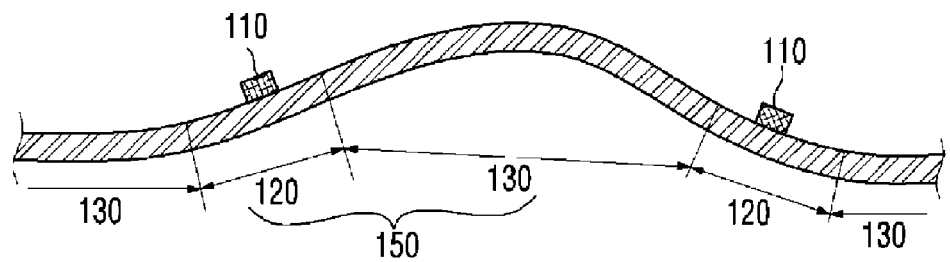
FIGS. 12a and 12b are cross sectional views showing the connection types of the supporting portion and the connecting portion of the substrate.
Figure 12B:
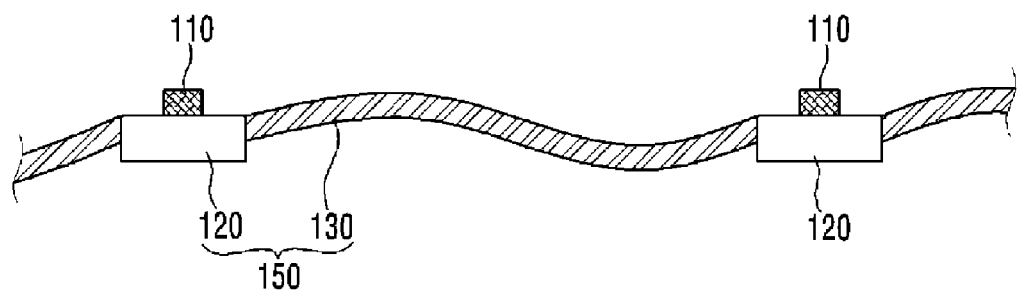

FIGS. 12a and 12b are cross sectional views showing the connection types of the supporting portion and the connecting portion of the substrate. FIG. 12a shows a substrate of which the supporting portion and the connecting portion are integrally formed with each other. FIG. 12b shows a substrate of which the supporting portion and the connecting portion are formed separately from each other.

Referring to FIGS. 12a and 12b, the light source module may include the substrate 150 and the plurality of the light sources 110 disposed on the substrate 150.

Also, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

According to the embodiment, as shown in FIG. 12a, the supporting portions 120 of the substrate 150 and the connecting portions 130 of the substrate 150 may be integrally formed with each other by using the same material.

The supporting portions 120 and the connecting portions 130 of the substrate 150 may include a base member and a circuit pattern disposed on at least one side of the base member. The material of the base member may be a film having flexibility and insulation, for example, polyimide or epoxy (e.g., FR-4).

Also, the supporting portions 120 and the connecting portions 130 of the substrate 150 may be a flexible and bendable material, so that the substrate 150 can be manufactured to be applied to an object which has a curvature and is mounted on the substrate 150.

As shown in FIG. 12b, the supporting portions 120 of the substrate 150 and the connecting portions 130 of the substrate 150 may be separately formed mutually different materials.

The supporting portion 120 of the substrate 150 may be a conductor, and the connecting portion 130 of the substrate 150 may be a nonconductor. In this case, the connecting portion 130 functions to connect the supporting portions 120, and the light sources can be electrically connected to each other through a separate wiring unit (not shown). Also, the supporting portion 120 of the substrate 150 may be a conductor, the inside of the connecting portion 130 of the substrate 150 may be a conductor, and the outside of the connecting portion 130 of the substrate 150 may be a nonconductor. In this case, the supporting portion 120 made of a conductor may be electrically connected to the inside of the connecting portion 130 made of a conductor.

Also, the supporting portion 120 of the substrate 150 may be formed of a hard and unbendable material in order to support the light source 110, and the connecting portion 130 of the substrate 150 may be a flexible and bendable material, so that the substrate 150 can be manufactured to be applied to an object which has a curvature and is mounted on the substrate 150.

Here, a coupling member (not shown) is disposed between the supporting portions 120 and the connecting portions 130 of the substrate 150 of which the supporting portion and the connecting portion are formed separately from each other, so that the supporting portions 120 and the connecting portions 130 can be electrically connected to each other.

As such, any one of the reflective coating film and the reflective coating material layer may be formed on the supporting portions 120 and the connecting portions 130 of the substrate 150 of which the supporting portion 120 and the connecting portion 130 are integrally or separately formed. The supporting portions 120 and the connecting portions 130 are capable of reflecting the light generated by the light source 110 toward the optical system 600.

Here, the reflective coating film or the reflective coating material layer may be comprised of metal or metal oxide which has a high reflectance, for example, Cr, Al, Ag, Au, $TiO_2$ and the like.

Conductive patterns may be disposed on the supporting portion 120 and the connecting portion 130 of the substrate 150 in order to apply a current to drive the light source 110.

For instance, the conductive patterns may be disposed on an entire area including the supporting portion 120 and the connecting portion 130 of the substrate 150, or may be disposed only on the supporting portion 120 of the substrate 150, which supports the light source 110.

In some cases, the conductive patterns may be disposed only on the connecting portion 130 connecting the adjacent supporting portions 120, so that the adjacent supporting portions 120 are electrically connected to each other.

As such, for the purpose of providing an overall uniform luminance, the connection type of the supporting portion 120 and the connecting portion 130 of the substrate 150 may be variously changed according to the design conditions of the light source module required by an object to be mounted.

Figure 13A:
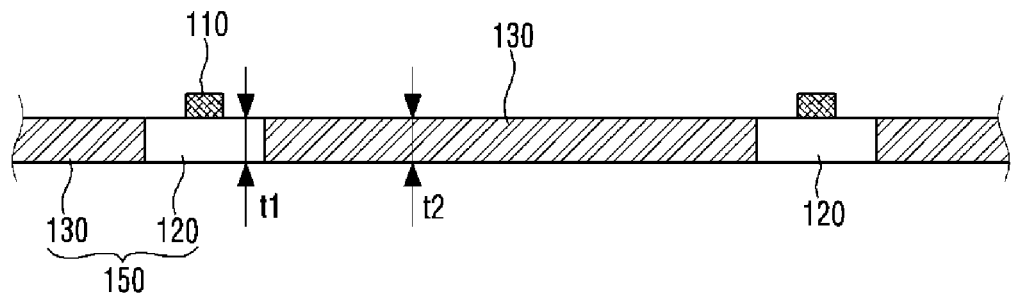
FIGS. 13a to 13c are cross sectional views showing the thicknesses of the supporting portion and the connecting portion of the substrate.
Figure 13B:
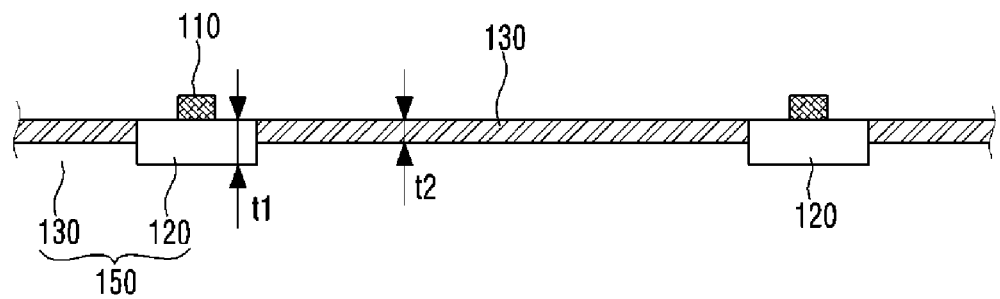
Figure 13C:
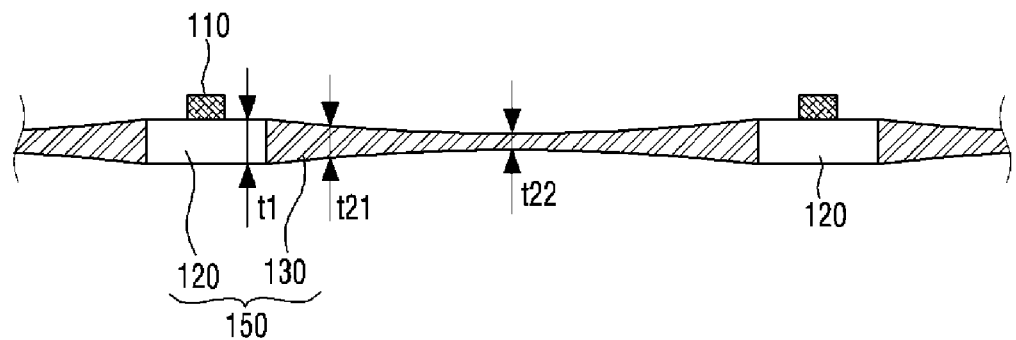

FIGS. 13a to 13c are cross sectional views showing the thicknesses of the supporting portion and the connecting portion of the substrate.

Referring to FIGS. 13a to 13c, the light source module may include the substrate 150 and the plurality of the light sources 110 disposed on the substrate 150.

Also, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

Here, as shown in FIG. 13a, the supporting portion 120 of the substrate 150 may have a first thickness t1, and the connecting portion 130 of the substrate 150 may have a second thickness t2. The first thickness t1 and the second thickness t2 may be the same as each other.

In some cases, as shown in FIG. 13b, the supporting portion 120 of the substrate 150 may have a first thickness t1, and the connecting portion 130 of the substrate 150 may have a second thickness t2. The first thickness t1 and the second thickness t2 may be different from each other. For example, when the connecting portion 130 is configured to have a structure of insulation layer-insulation layer/insulation layer-conductive layer-insulation layer, a portion including the conductive layer may be the thickest.

Here, the first thickness t1 may be larger than the second thickness t2. For example, a ratio of the first thickness t1 to the second thickness t2 may be about 1.1:1 to 30:1.

The second thickness t2 is less than the first thickness t1 in order to cause the substrate 150 to be easily flexible.

For another example, as shown in FIG. 13c, a thickness t22 of the connecting portion 130 of the substrate 150, which is farther from the supporting portion 120 of the substrate 150, may be less than a thickness t21 of the connecting portion 130 of the substrate 150, which is adjacent to the supporting portion 120 of the substrate 150.

That is, the connecting portion 130 of the substrate 150 may be gradually reduced toward a portion far from the supporting portion 120 of the substrate 150 from a portion adjacent to the supporting portion 120 of the substrate 150.

Here, the thickness of the connecting portion 130 of the substrate 150 is gradually reduced in order to cause the substrate 150 to be easily flexible.

As such, for the purpose of providing an overall uniform luminance, the thicknesses of the supporting portion 120 and the connecting portion 130 of the substrate 150 may be variously changed according to the design conditions of the light source module required by an object to be mounted.

Figure 14:
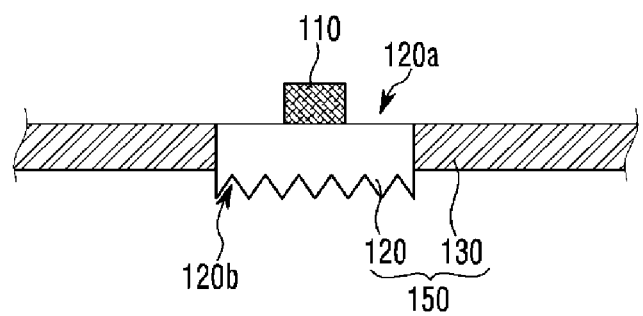
FIG. 14 is a cross sectional view showing the surface of the supporting portion of the substrate according to the embodiment.

FIG. 14 is a cross sectional view showing the surface of the supporting portion of the substrate according to the embodiment.

According to another embodiment, as shown in FIG. 14, the light source module may include the substrate 150 and the plurality of the light sources 110 disposed on the substrate 150.

Also, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

Here, the supporting portions 120 of the substrate 150 may include a first surface 120a facing the light source 110, and a second surface 120b facing the first surface 120a. The first surface 120a may be flat and the second surface 120b may have an unevenness pattern.

As such, the first surface 120a of the supporting portion 120 is formed to be flat in order to improve the luminance by reflecting upward the light generated from the light source 110.

Also, the unevenness pattern is formed on the second surface 120b of the supporting portion 120 in order to easily radiate the heat generated from the light source 110 to the outside.

As such, for the purpose of providing an overall uniform luminance, the surface of the supporting portion 120 of the substrate 150 may be variously changed according to the design conditions of the light source module required by an object to be mounted.

Figure 15:
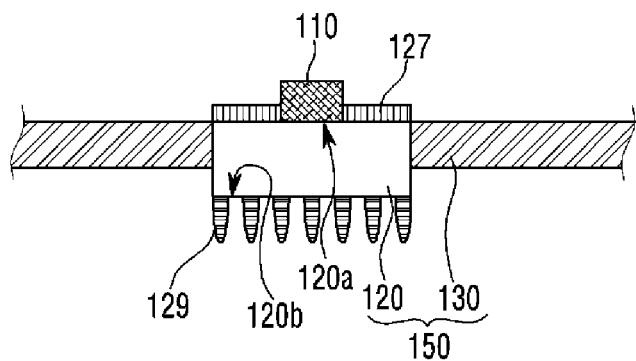
FIG. 15 is a cross sectional view showing a reflector and a heat radiating fin of the supporting portion of the substrate according to the embodiment.

FIG. 15 is a cross sectional view showing a reflector and a heat radiating fin of the supporting portion of the substrate according to the embodiment.

According to another embodiment, as shown in FIG. 15, the light source module may include the substrate 150 and the plurality of the light sources 110 disposed on the substrate 150.

Also, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

Here, the supporting portions 120 of the substrate 150 may include a first surface 120a facing the light source 110, and a second surface 120b facing the first surface 120a. A reflector 127 is disposed on the first surface 120a, and a plurality of heat radiating fins 129 are disposed on the second surface 120b, so that heat radiation performance can be enhanced. For example, the reflector 127 may be comprised of metal or metal oxide which has a high reflectance, for example, Cr, Al, Ag, Au, $TiO_2$ and the like.

The heat radiating fins 129 may be, for example, formed of a material having a high thermal conductivity, e.g., aluminum, aluminum alloy, copper or copper alloy.

As such, the reflector 127 is formed on the first surface 120a of the supporting portion 120 in order to improve the luminance by reflecting upward the light generated from the light source 110.

The heat radiating fins 129 are formed on the second surface 120b of the supporting portion 120 in order to easily radiate the heat generated from the light source 110 to the outside.

As such, for the purpose of providing an overall uniform luminance, the reflector 127 and the heat radiating fins 129 of the supporting portion 120 of the substrate 150 may be variously changed according to the design conditions of the light source module required by an object to be mounted.

Figure 16A:
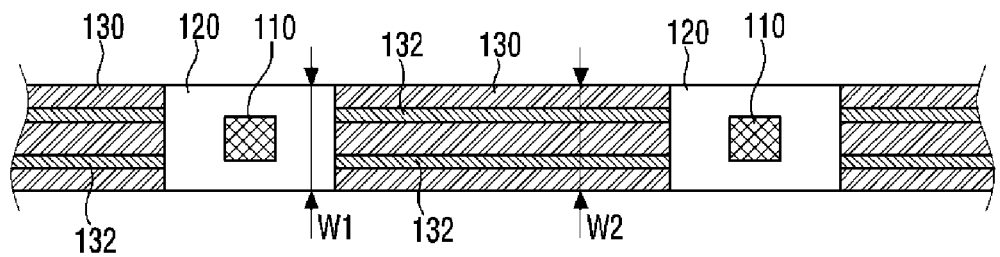
FIGS. 16a and 16b are plan views showing the width of the connecting portion of the substrate.
Figure 16B:
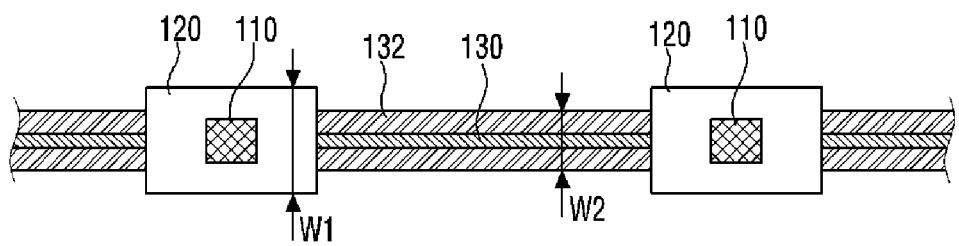

FIGS. 16a and 16b are plan views showing the width of the connecting portion of the substrate.

According to another embodiment, as shown in FIGS. 16a and 16b, the light source module may include the substrate 150 and the plurality of the light sources 110 disposed on the substrate 150.

Also, the substrate 150 may include the plurality of supporting portions 120 and the connecting portions 130. The supporting portions 120 may be disposed corresponding to the light sources 110 respectively, and the connecting portion 130 may be disposed between the adjacent supporting portions 120.

Here, circuit patterns 132 which electrically connect the adjacent light sources 110 may be disposed in the connecting portion 130 of the substrate 150. Thus, for the purpose of electrical connection between one supporting portion and another supporting portion, the conductive patterns can be disposed. Also, thanks to the circuit pattern 132, the light source 110 does not require a separate electric power supply line.

Here, as shown in FIG. 16a, a width W2 of the connecting portion 130 of the substrate 150 may be the same as a width W1 of the supporting portion 120 of the substrate 150.

When the width W2 of the connecting portion 130 of the substrate 150 is the same as the width W1 of the supporting portion 120 of the substrate 150, it is possible to obtain an available space for designing the conductive pattern 132 in various types.

As shown in FIG. 16b, the width W2 of the connecting portion 130 of the substrate 150 may be less than the width W1 of the supporting portion 120 of the substrate 150.

When the width W2 of the connecting portion 130 of the substrate 150 is less than the width W1 of the supporting portion 120 of the substrate 150, the substrate 150 can be easily flexible and thus be applied to an object which has a curvature and is mounted on the substrate 150.

As such, for the purpose of providing an overall uniform luminance, the width of the connecting portion 130 of the substrate 150 may be variously changed according to the design conditions of the light source module required by an object to be mounted.

Figure 17:
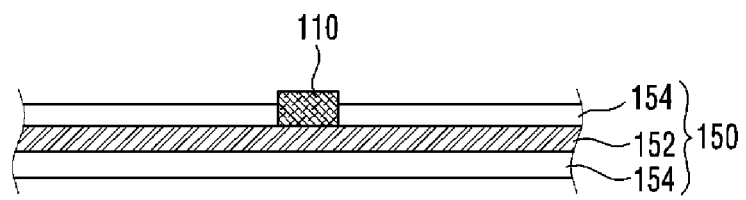
FIG. 17 is a cross sectional view showing the light source module according to the embodiment.

FIG. 17 is a cross sectional view showing the light source module according to the embodiment.

Referring to FIG. 17, the light source module may include the substrate 150 and the plurality of the light sources 110 disposed on the substrate 150.

Here, a circuit pattern 152 for being electrically connected to the light source may be disposed in the substrate 150 of the light source module. A film 154 having flexibility and insulation may be disposed on at least one of on and under the circuit pattern 152.

For example, the film 154 of the substrate 150 may be formed of any one selected from the group consisting of Photo Solder Resist (PSR), polyimide, epoxy (e.g., FR-4) and the like or may be formed through any combination of them.

In some cases, when the film 154 of the substrate 150 is disposed on and under the circuit pattern 152, the film disposed on the circuit pattern 152 may be different from the film disposed under the circuit pattern 152.

For another example, the substrate 150 of the light source module may be a printed circuit board (PCB) substrate comprised of any one selected from the group consisting of polyethylene terephthalate (PET), glass, polycarbonate (PC), silicon (Si), polyimide, epoxy and the like. For instance, a single layer PCB, a multi layer PCB, a ceramic substrate, a metal core PCB, etc., may be selectively used as the substrate 150 of the light source module.

Next, the light source 110 of the light source module may be a top view type light emitting diode. In some cases, the light source 110 of the light source module may be a side view type light emitting diode.

Here, the light source 110 of the light source module may be a light emitting diode (LED) chip. The LED chip may be formed of a red LED chip, a blue LED chip or an ultraviolet ray LED chip, or may be formed in the form of a package obtained by combining at least one or more of a red LED chip, a green LED chip, a blue LED chip, a yellow green LED chip and a white LED chip.

In the embodiment, the lamp unit is applied to the tail lamp unit of the vehicle, the light source 110 of the light source module may be a vertical light emitting chip, for example, a red light emitting chip, and is not limited to this.

Figure 18:
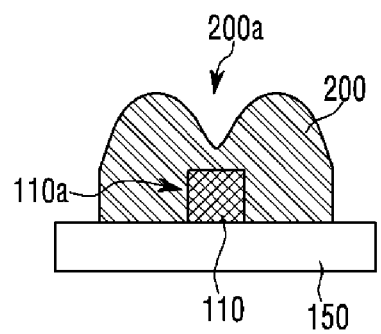
FIG. 18 is a cross sectional view showing a lens of the light source module according to the embodiment.

FIG. 18 is a cross sectional view showing a lens of the light source module according to the embodiment.

According to the embodiment, as shown in FIG. 18, the light source module may include the substrate 150 including electrode patterns, and the light sources 110 disposed on the substrate 150.

Here, the light source 110 of the light source module may include the lens 200. The lens 200 may include a recess 200a formed on a position corresponding to the central area of a light emitting surface 110a of the light source 110.

Here, in the cross section of the recess 200a may have a conical shape or a trapezoidal shape, of which the upper surface is large and the lower surface is small.

As such, the recess 200a is formed in the lens 200 in order to increase the beam angle of the light emitted from the light source 110.

According to another embodiment, the lenses 200 based on the embodiment may be used.

Figure 19A:
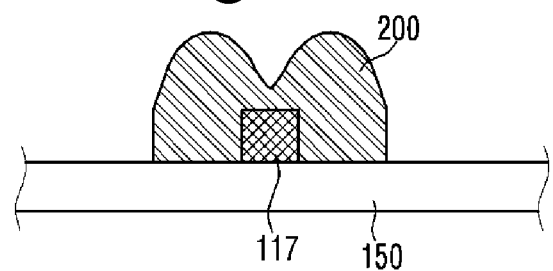
FIGS. 19a to 19c are cross sectional views showing the lens types applied to the light source module.
Figure 19B:
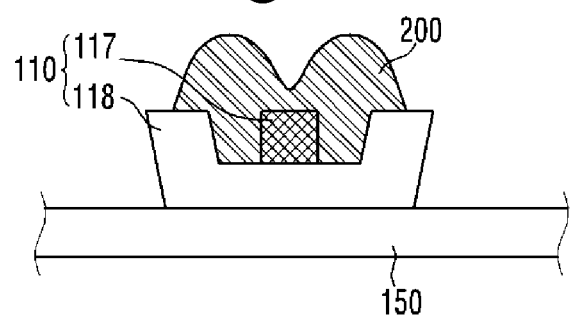
Figure 19C:
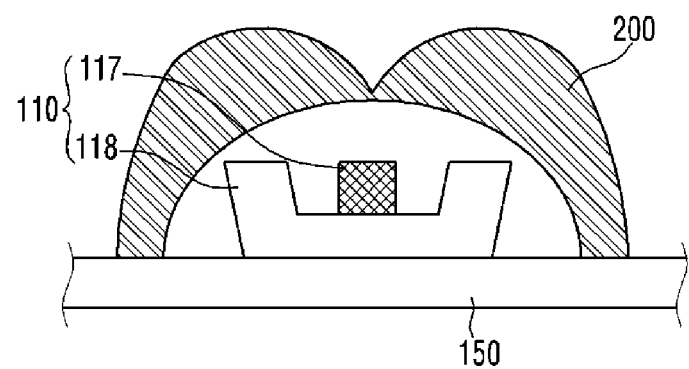

FIGS. 19a to 19c are cross sectional views showing the lens types applied to the light source module.

As shown in FIGS. 19a to 19c, the light source module may include the substrate 150, the light source 110 and the lens 200.

Here, the light source 110 of the light source module may have an LED chip 117 type or may have an LED package type formed by disposing the LED chip 117 within a package body 118.

The lens 200 may be disposed to cover the light source 110. Based on the type of the light source 110 of the light source module, lenses 200 having a variety of structures may be applied.

For example, as shown in FIG. 19a, in the light source 110 of the light source module, when the LED chip 117 is disposed on the substrate 150, the lens 200 may be disposed on the substrate 150 to cover the LED chip 117.

Also, as shown in FIG. 19b, when the light source 110 of the light source module has the LED package type in which the LED chip 117 is disposed with the package body 118, the lens 200 may be disposed on the package body 118 to cover the LED chip 117.

Subsequently, as shown in FIG. 19c, when the light source 110 of the light source module has the LED package type in which the LED chip 117 is disposed with the package body 118, the lens 200 may be disposed on the substrate 150 in such a manner as to cover the entire package body 118 including the LED chip 117.

Here, the lens 200 may be spaced apart from the package body 118 by a predetermined distance and cover the LED package.

Figure 20:
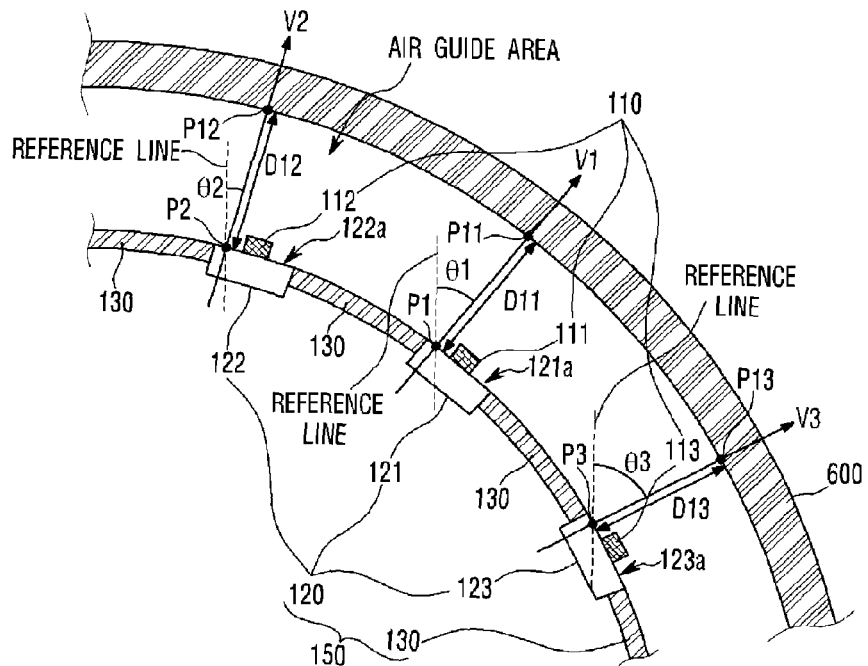
FIG. 20 is a cross sectional view showing the arrangement of the light source modules according to a fourth embodiment.

FIG. 20 is a cross sectional view showing the arrangement of the light source modules according to a fourth embodiment.

As shown in FIG. 20, the optical system 600 may be disposed apart from the substrate 150 by a predetermined distance. The light mixing area may be formed in the space between the substrate 150 and the optical system 600.

The light source module may include the substrate 150 and a plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Here, the plurality of the light sources 110 may include a first light source 111, a second light source 112 and a third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction.

Here, the already set reference direction includes a direction which is used to measure the amount or intensity of light generated from the plurality of the light sources 110. When an object to be applied requires predetermined conditions, for example, the amount or intensity of the light emitted in a particular direction, the already set reference direction or the predetermined reference direction includes the particular direction. For instance, when the already set reference direction or the predetermined reference direction includes predetermined conditions, such as the amount or intensity of the light emitted in a particular direction, the lamp unit may be designed according to the requirements. The predetermined reference direction may match the longitudinal direction of the vehicle. However, the reference direction is not limited to a particular direction and includes a randomly selected reference direction.

The second supporting portion 122 may be disposed such that a second vertical line V2 passing through a second point P2 of the surface 122a of the second supporting portion 122, which faces the second light source 112, has a second angle of θ2 with respect to the reference line.

The third supporting portion 123 may be disposed such that a third vertical line V3 passing through a third point P3 of the surface 123a of the third supporting portion 123, which faces the third light source 113, has a third angle of θ3 with respect to the reference line.

Here, the first vertical line V1 passing through the first point P1 of the surface 121a of the first supporting portion 121, which faces the first light source 111, passes through a point P11 of the optical system 600. The second vertical line V2 passing through the second point P2 of the surface 122a of the second supporting portion 122, which faces the second light source 112, passes through a point P12 of the optical system 600. The third vertical line V3 passing through the third point P3 of the surface 123a of the third supporting portion 123, which faces the third light source 113, passes through a point P13 of the optical system 600. In this case, an distance D11 between the point P11 of the optical system 600 and the surface 121a of the first supporting portion 121, a distance D12 between the point P12 of the optical system 600 and the surface 122a of the second supporting portion 122, and a distance D13 between the point P13 of the optical system 600 and the surface 123a of the third supporting portion 123 may be the same as each other.

In some cases, at least any one of the distance D11, the distance D12, and the distance D13 may be different from the others.

Here, the distance D11, the distance D12, and the distance D13 may be greater than about 10 mm.

For example, the distance D11, the distance D12, and the distance D13 may be about 10 mm to 50 mm.

If the distance between the corresponding point of the optical system 600 and the surface of the supporting portion 120 is less than about 10 mm, the lamp unit does not have uniform luminance and a hot spot may occur where a strong luminance appears at an area where the light source 110 is located.

Also, if the distance between the corresponding point of the optical system 600 and the surface of the supporting portion 120 is greater than about 50 mm, the lamp unit has a weak luminance, so that the lamp unit is unable to perform its function.

As such, the supporting portion 120 of the substrate 150 may be disposed at a predetermined angle with respect to the reference line facing toward the already set reference direction. The already set reference direction is a direction which is used to measure the amount or intensity of light generated from the plurality of the light sources 110. When an object to be applied requires predetermined conditions, for example, the amount or intensity of the light emitted in a particular direction, the light source module may be disposed according to the requirements.

For example, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 cm$^2$. For example, the brightness for a brake lamp should be about 40 to 45 candela (cd).

Therefore, since the entire design of the light source module should be performed on the basis of the already set reference direction, the supporting portion 120 of the substrate 150 may be disposed at a predetermined angle with respect to the reference line facing toward the already set reference direction.

Figure 21:
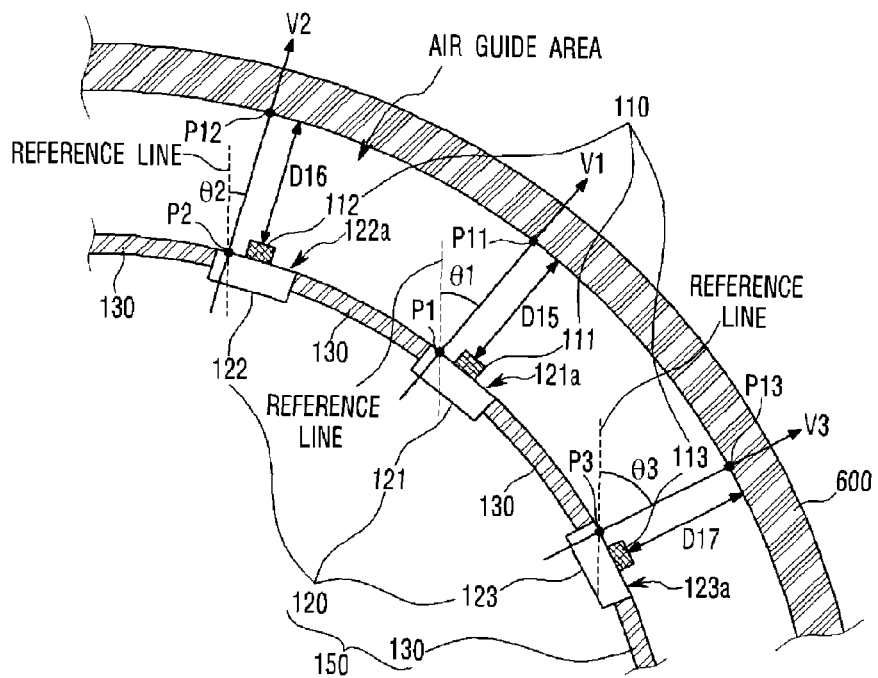
FIG. 21 is a cross sectional view showing the arrangement of the light source modules according to a fifth embodiment.

FIG. 21 is a cross sectional view showing the arrangement of the light source modules according to a fifth embodiment.

Referring to FIG. 21, the optical system 600 may be disposed apart from the substrate 150 by a predetermined distance. The light mixing area may be formed in the space between the substrate 150 and the optical system 600.

The light source module may include the substrate 150 and a plurality of the light sources 110 disposed on the substrate 150.

Here, the plurality of the light sources 110 may include the first light source 111, the second light source 112, and the third light source 113. The first light source 111 may be supported by the first supporting portion 121. The second light source 112 may be supported by the second supporting portion 122. The third light source 113 may be supported by the third supporting portion 123.

Here, the plurality of the light sources 110 are disposed apart from the optical system 600 by a certain distance. The plurality of the light sources 110 may be spaced apart from the optical system 600 by the same distance.

For example, when the surface of the first light source 111 faces the surface of the optical system 600, there is a distance D15 between the surface of the first light source 111 and the surface of the optical system 600. When the surface of the second light source 112 faces the surface of the optical system 600, there is a distance D16 between the surface of the second light source 112 and the surface of the optical system 600. When the surface of the third light source 113 faces the surface of the optical system 600, there is a distance D17 between the surface of the third light source 113 and the surface of the optical system 600.

Here, the distance D15, the distance D16, and the distance D17 may be the same as each other.

This intends to provide an overall uniform luminance.

In some cases, at least any one of the distance D15, the distance D16, and the distance D17 may be different from the others.

Figure 22:
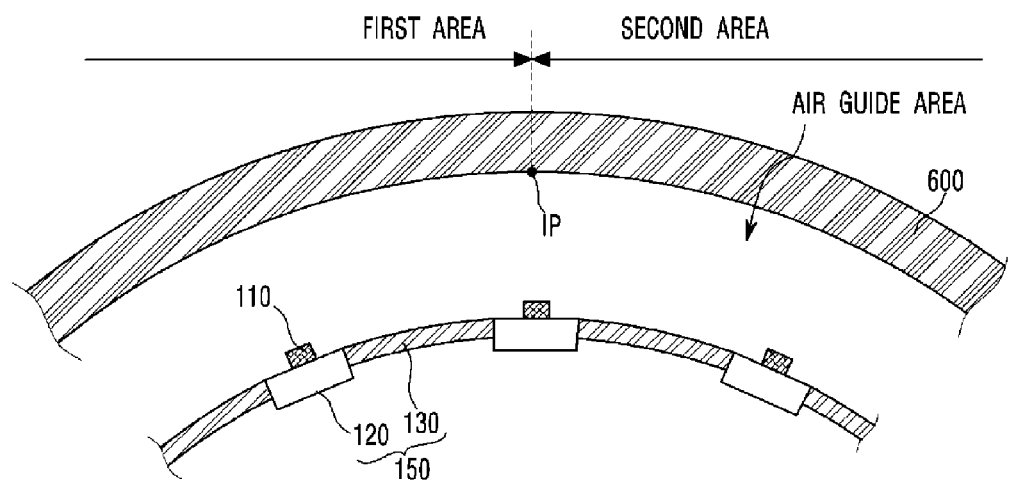
FIG. 22 is a cross sectional view showing the shape of an optical system.

FIG. 22 is a cross sectional view showing the shape of an optical system.

Referring to FIG. 22, the optical system 600 may be disposed apart from the substrate 150 by a predetermined distance. The light mixing area may be formed in the space between the substrate 150 and the optical system 600.

The light source module may include the substrate 150 and a plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

Here, the optical system 600 is able to function as the cover member (not shown).

Also, the optical system 600 may include at least two inclined surfaces having at least one inflection point (IP).

For example, the optical system 600 may be divided into a first area and a second area on the basis of the inflection point (IP).

Here, the inclined surface of the first area of the optical system 600 may have a first curvature radius, and the inclined surface of the second area of the optical system 600 may have the second curvature radius. The first curvature radius and the second curvature radius may be different from each other.

In some cases, the optical system 600 may have a plurality of the inflection points. The curvature radii of the inclined surfaces adjacent to each other around the each inflection point IP may be different from each other.

Also, the optical system 600 is comprised of at least one sheet. The optical system 600 may selectively include a diffusion sheet, a prism sheet and a brightness enhancement sheet, and the like.

Here, the diffusion sheet diffuses the light emitted from the light source 110. The prism sheet guides the diffused light to the light emitting area. The brightness enhancement sheet enhances the brightness.

For example, the diffusion sheet may be generally formed of an acrylic resin and is not limited to this. The diffusion sheet may be formed of a material capable of diffusing the light, for example, high transmissive plastic such as polystyrene (PS), polymethyl methacrylate (PMMA), circular olefin copolyester (COC), polyethylene terephthalate (PET) and resin.

The optical system 600 may have an unevenness pattern on the upper surface thereof.

The optical system 600 functions to diffuse the light emitted from the light source module. In order to increase the diffusion effect, the unevenness pattern may be formed on the upper surface.

In other words, the optical system 600 may be comprised of several layers. The unevenness pattern may be formed on the surface of the top surface or on the surface of any one layer.

The unevenness pattern may have a strip shape which is arranged in one direction.

Here, the unevenness pattern has a convex projection from the surface of the optical system 600. The projection has a first side and a second side, both of which face each other. An angle between the first side and the second side may be an obtuse angle or an acute angle.

In some cases, the unevenness pattern may have a concave recess within the surface of the optical system 600. The recess is comprised of a third side and a fourth side, both of which face each other. An angle between the third side and the fourth side may be an obtuse angle or an acute angle.

FIGS. 23*a* to 23*d* are cross sectional views showing unevenness patterns of the optical system.

Referring to FIGS. 23*a* to 23*d*, the optical system 600 functions to diffuse the light emitted from the light source module. In order to increase the diffusion effect, an unevenness pattern 610 may be formed on the upper surface.

Here, the unevenness pattern 610 may have a strip shape which is arranged in one direction.

Figure 23A:
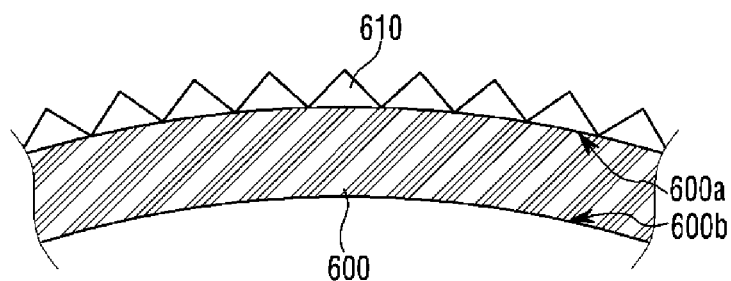
FIGS. 23a to 23d are cross sectional views showing unevenness patterns of the optical system.

As shown in FIG. 23*a*, the unevenness pattern 610 of the optical system 600 may be disposed on the upper surface 600*a* of the optical system 600. The upper surface 600*a* of the optical system 600 may face the cover member (not shown).

Here, when the optical system 600 consists of multiple layers, the unevenness pattern 610 may be disposed on the surface of the top layer of the optical system 600.

Figure 23B:
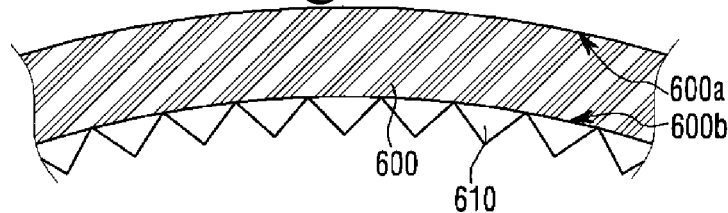

Subsequently, as shown in FIG. 23*b*, the unevenness pattern 610 of the optical system 600 may be disposed on the lower surface 600*b* of the optical system 600. The lower surface 600*b* of the optical system 600 may face the light source module (not shown).

Here, when the optical system 600 consists of multiple layers, the unevenness pattern 610 may be disposed on the surface of the bottom layer of the optical system 600.

Figure 23C:
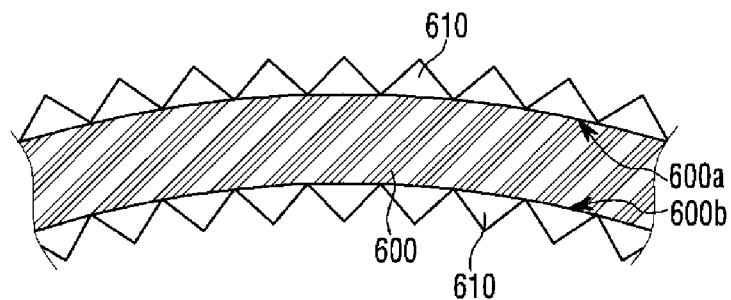

As shown in FIG. 23*c*, the unevenness pattern 610 of the optical system 600 may be disposed on the upper surface 600*a* of the optical system 600 and on the lower surface 600*b* of the optical system 600. When the optical system 600 consists of multiple layers, the unevenness pattern 610 may be disposed on the surface of the top layer and on the surface of the bottom layer of the optical system 600 respectively.

Figure 23D:
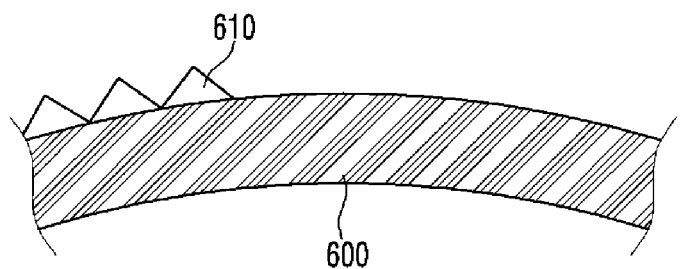

As shown in FIG. 23*d*, the unevenness pattern 610 of the optical system 600 may be disposed on a portion of the upper surface 600*a* of the optical system 600 or on a portion of the lower surface 600*b* of the optical system 600.

Here, the unevenness pattern has a convex projection from the surface of the optical system 600. The projection has a first side and a second side, both of which face each other. An angle between the first side and the second side may be an obtuse angle or an acute angle.

In some cases, the unevenness pattern may have a concave recess within the surface of the optical system 600. The recess is comprised of a third side and a fourth side, both of which face each other. An angle between the third side and the fourth side may be an obtuse angle or an acute angle.

As such, for the purpose of providing an overall uniform luminance, the unevenness pattern 610 of the optical system 600 may be variously changed according to the design conditions of the light source module required by an object to be mounted.

Figure 24:
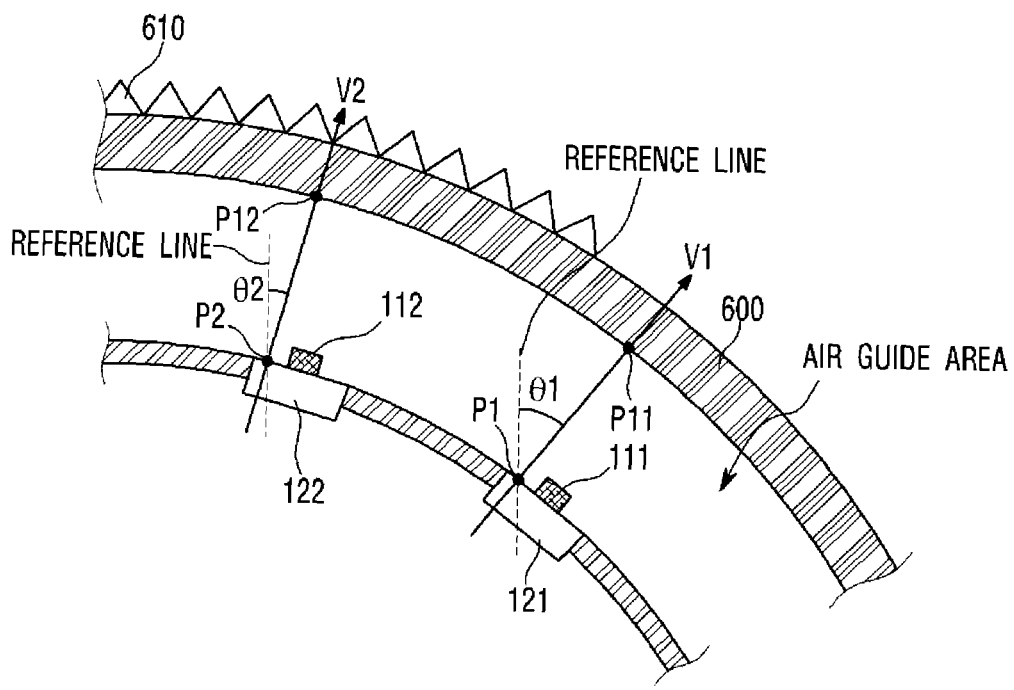
FIG. 24 is a cross sectional view showing the position of the unevenness pattern of the optical system.

FIG. 24 is a cross sectional view showing the position of the unevenness pattern of the optical system.

Referring to FIG. 24, the unevenness pattern 610 of the optical system 600 may be disposed on a portion of the upper surface 600a of the optical system 600 or on a portion of the lower surface 600b of the optical system 600.

Here, the unevenness pattern 610 of the optical system 600 may be disposed on the surface of the optical system 600, which corresponds to the supporting portions where an angle between the reference line facing toward the already set reference direction and a vertical line passing through any one point of the surface of the supporting portion facing the light source is from 0 to 45 degree.

Also, the unevenness pattern 610 of the optical system 600 may not be disposed on the surface of the optical system 600, which corresponds to the supporting portions where an angle between the reference line facing toward the already set reference direction and a vertical line passing through any one point of the surface of the supporting portion facing the light source is from 45.1 to 90 degree.

As such, the unevenness pattern 610 of the optical system 600 is disposed only on the surface of the optical system 600, which corresponds to the supporting portions where an angle between the reference line facing toward the already set reference direction and a vertical line passing through any one point of the surface of the supporting portion facing the light source is from 0 to 45 degree. This intends to provide uniform luminance in the already set reference direction which is used to measure the amount or intensity of light generated from the plurality of the light sources 110.

For example, in a case where the first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction, and in a case where the second supporting portion 122 may be disposed such that a second vertical line V2 passing through a second point P2 of the surface 122a of the second supporting portion 122, which faces the second light source 112, has a second angle of θ2 with respect to the reference line, when the second angle of θ2 is less than the first angle of θ1, the unevenness pattern 610 of the optical system 600 may be disposed corresponding to the second supporting portion 122.

As such, for the purpose of providing an overall uniform luminance, the position of the unevenness pattern 610 of the optical system 600 may be variously changed according to the design conditions of the light source module required by an object to be mounted.

Figure 25A:
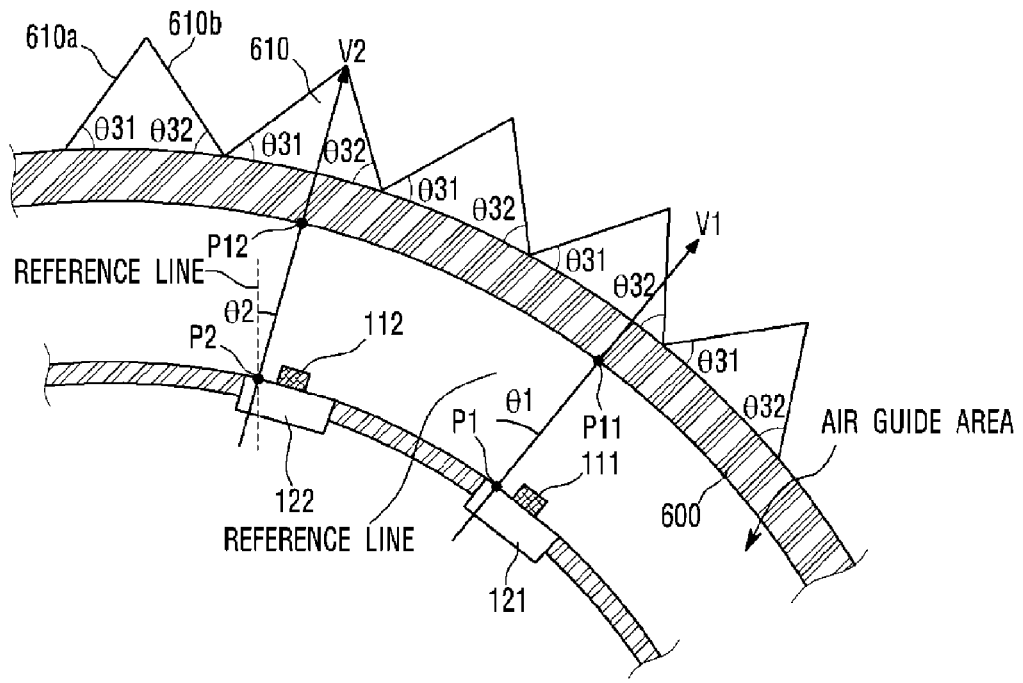
FIGS. 25a and 25b are cross sectional views showing that the shape of the unevenness pattern of the optical system is changed depending on the position of the unevenness pattern.
Figure 25B:
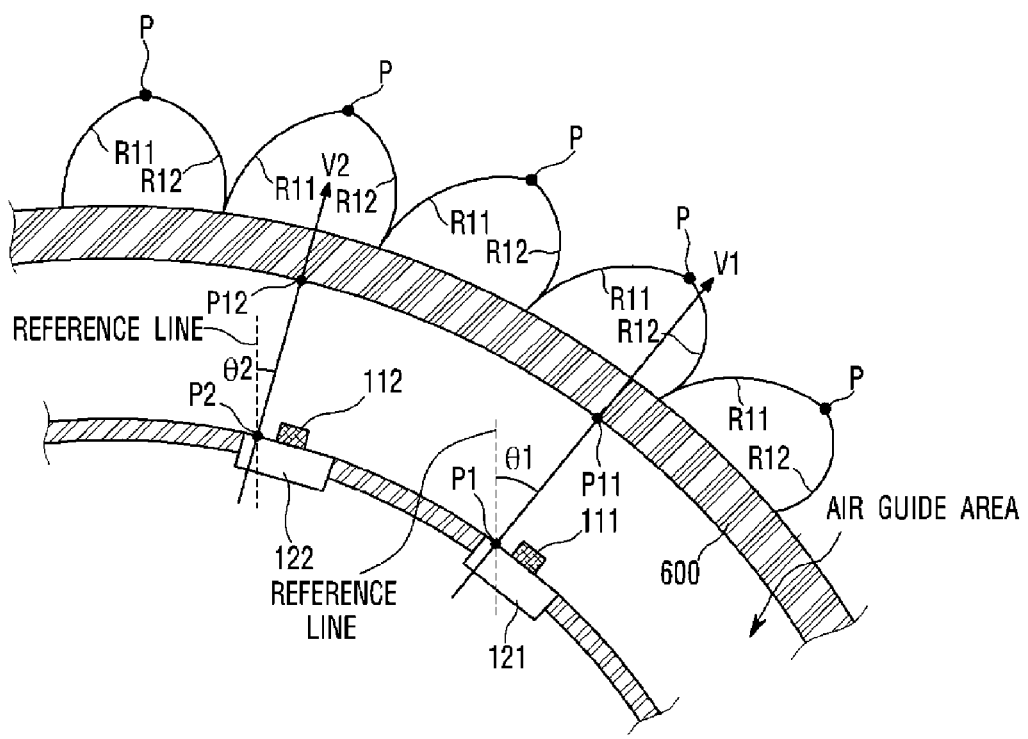

FIGS. 25a and 25b are cross sectional views showing that the shape of the unevenness pattern of the optical system is changed depending on the position of the unevenness pattern.

Referring to FIGS. 25a and 25b, the unevenness pattern 610 of the optical system 600 may be disposed on the upper surface 600a of the optical system 600 or on the lower surface 600b of the optical system 600.

Here, the unevenness pattern 610 of the optical system 600 may have a convex projection from the surface of the optical system 600. The cross section of the projection may have, as shown in FIG. 25a, a triangular shape or may have, as shown in FIG. 25b, a hemispherical shape. However, the shape of the cross section of the projection is not limited to this.

In some cases, the unevenness pattern 610 of the optical system 600 may have a concave recess within the surface of the optical system 600. The cross section of the recess may have a triangular shape or a hemispherical shape. However, the shape of the cross section of the recess is not limited to this.

In the embodiment, as shown in FIG. 25a, when the cross section of the unevenness pattern 610 has a triangular shape, the unevenness pattern 610 may include a first side 610a and a second side 610b, both of which face each other.

Here, an angle of θ31 between the first side 610a of the unevenness pattern 610 and the surface of the optical system 600 may be the same as or different from an angle of θ32 between the second side 610b of the unevenness pattern 610 and the surface of the optical system 600.

For example, the angle of θ31 between the first side 610a of the unevenness pattern 610 and the surface of the optical system 600 may be gradually reduced with the increase of the angle between the reference line facing toward the already set reference direction and a vertical line passing through any one point of the surface of the supporting portion facing the light source.

Also, the angle of θ32 between the second side 610b of the unevenness pattern 610 and the surface of the optical system 600 may be gradually increased with the increase of the angle between the reference line facing toward the already set reference direction and a vertical line passing through any one point of the surface of the supporting portion facing the light source.

As such, with the increase of the angle between the reference line facing toward the already set reference direction and a vertical line passing through any one point of the surface of the supporting portion facing the light source, the angle of θ31 between the first side 610a of the unevenness pattern 610 and the surface of the optical system 600 is gradually reduced and the angle of θ32 between the second side 610b of the unevenness pattern 610 and the surface of the optical system 600 is gradually increased. This intends to provide uniform luminance in the already set reference direction which is used to measure the amount or intensity of light generated from the plurality of the light sources 110.

For example, in a case where the first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction, and in a case where the second supporting portion 122 may be disposed such that a second vertical line V2 passing through a second point P2 of the surface 122a of the second supporting portion 122, which faces the second light source 112, has a second angle of θ2 with respect to the reference line, when the second angle of θ2 is less than the first angle of θ1, the angle of θ31 of the unevenness pattern 610 corresponding to the first supporting portion 121 may be less than the angle of θ31 of the unevenness pattern 610 corresponding to the second supporting portion 122, and the angle of θ32 of the unevenness pattern 610 corresponding to the first supporting portion 121 may be greater than the angle of θ32 of the unevenness pattern 610 corresponding to the second supporting portion 122.

As shown in FIG. 25b, when the cross section of the unevenness pattern 610 has a hemispherical shape, the unevenness pattern 610 may include an inclined surface having a curvature radius R11 and an inclined surface having a curvature radius R12 on the basis of the inflection point.

Here, the curvature radius R11 of the inclined surface of the unevenness pattern 610 may be the same as or different from the curvature radius R12 of the inclined surface of the unevenness pattern 610.

For example, the curvature radius R11 of the inclined surface of the unevenness pattern 610 may be gradually increased with the increase of the angle between the reference line facing toward the already set reference direction and a vertical line passing through any one point of the surface of the supporting portion facing the light source.

The curvature radius R12 of the inclined surface of the unevenness pattern 610 may be gradually reduced with the increase of the angle between the reference line facing toward the already set reference direction and a vertical line passing through any one point of the surface of the supporting portion facing the light source.

As such, with the increase of the angle between the reference line facing toward the already set reference direction and a vertical line passing through any one point of the surface of the supporting portion facing the light source, the curvature radius R11 of the inclined surface of the unevenness pattern 610 is gradually increased, and the curvature radius R12 of the inclined surface of the unevenness pattern 610 is gradually reduced. This intends to provide uniform luminance in the already set reference direction which is used to measure the amount or intensity of light generated from the plurality of the light sources 110.

For example, in a case where the first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction, and in a case where the second supporting portion 122 may be disposed such that a second vertical line V2 passing through a second point P2 of the surface 122a of the second supporting portion 122, which faces the second light source 112, has a second angle of θ2 with respect to the reference line, when the second angle of θ2 is less than the first angle of θ1, the curvature radius R11 of the inclined surface of the unevenness pattern 610 corresponding to the first supporting portion 121 may be larger than the curvature radius R11 of the inclined surface of the unevenness pattern 610 corresponding to the second supporting portion 122, and the curvature radius R12 of the inclined surface of the unevenness pattern 610 corresponding to the first supporting portion 121 may be less than the curvature radius R12 of the inclined surface of the unevenness pattern 610 corresponding to the second supporting portion 122.

As such, for the purpose of providing an overall uniform luminance, the shape according to the position of the unevenness pattern 610 of the optical system 600 may be variously changed according to the design conditions of the light source module required by an object to be mounted.

Figure 26A:
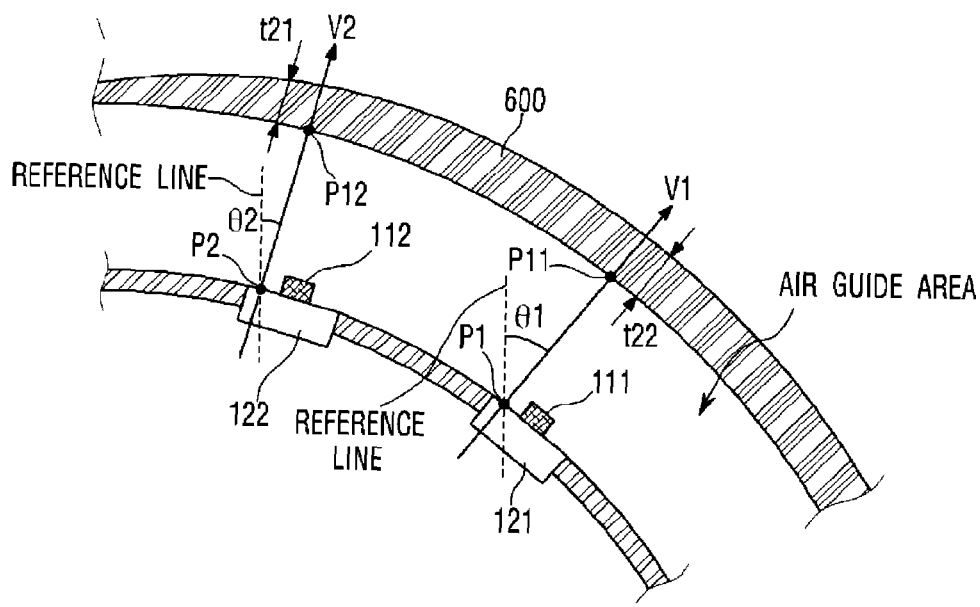
FIGS. 26a and 26b are cross sectional views showing the thickness of the optical system.
Figure 26B:
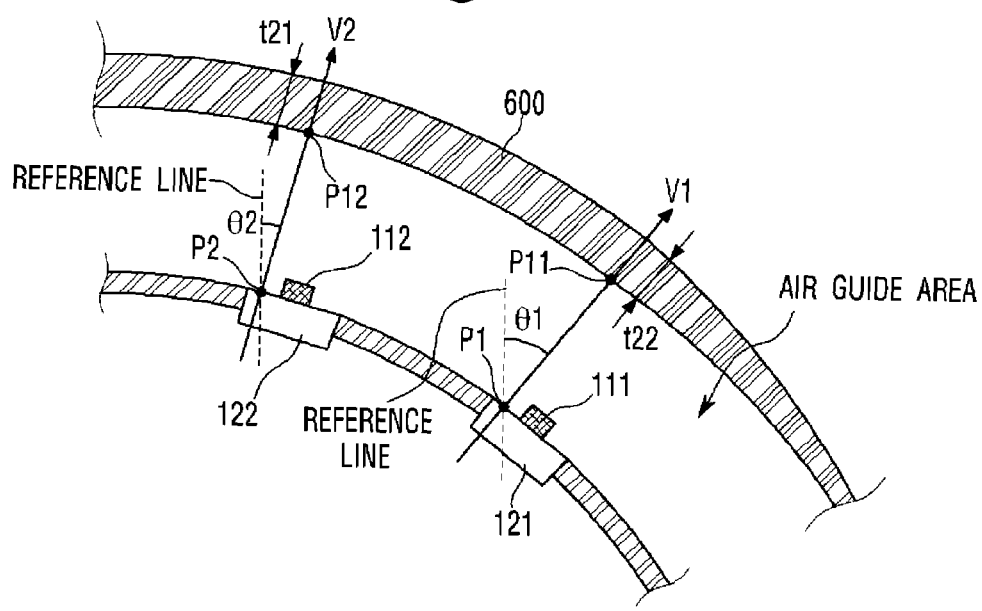

FIGS. 26a and 26b are cross sectional views showing the thickness of the optical system.

Referring to FIGS. 26a and 26b, the optical system 600 may be disposed apart from the substrate 150 by a predetermined distance. The light mixing area may be formed in the space between the substrate 150 and the optical system 600.

The light source module may include the substrate 150 and a plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

As shown in FIG. 26a, in the optical system 600, a thickness t21 of an area corresponding to the supporting portions where an angle between the reference line facing toward the already set reference direction and a vertical line passing through any one point of the surface of the supporting portion facing the light source is from 0 to 45 degree may be less than a thickness t22 of an area corresponding to the supporting portions where an angle between the reference line facing toward the already set reference direction and a vertical line passing through any one point of the surface of the supporting portion facing the light source is from 45.1 to 90 degree.

As such, the thickness of the optical system 600 is changed. This intends to provide larger amount of the light in the already set reference direction which is used to measure the amount or intensity of light generated from the plurality of the light sources 110.

For example, in a case where the first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction, and in a case where the second supporting portion 122 may be disposed such that a second vertical line V2 passing through a second point P2 of the surface 122a of the second supporting portion 122, which faces the second light source 112, has a second angle of θ2 with respect to the reference line, when the second angle of θ2 is less than the first angle of θ1, the thickness t21 of the optical system 600 corresponding to the second supporting portion 122 may less than the thickness t22 of the optical system 600 corresponding to the first supporting portion 121.

In some cases, as shown in FIG. 26b, in the optical system 600, the thickness t21 of the area corresponding to the supporting portions where an angle between the reference line facing toward the already set reference direction and a vertical line passing through any one point of the surface of the supporting portion facing the light source is from 0 to 45 degree may be larger than the thickness t22 of the area corresponding to the supporting portions where an angle between the reference line facing toward the already set reference direction and a vertical line passing through any one point of the surface of the supporting portion facing the light source is from 45.1 to 90 degree.

For example, in a case where the first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction, and in a case where the second supporting portion 122 may be disposed such that a second vertical line V2 passing through a second point P2 of the surface 122a of the second supporting portion 122, which faces the second light source 112, has a second angle of θ2 with respect to the reference line, when the second angle of θ2 is larger than the first angle of θ1, the thickness t21 of the optical system 600 corresponding to the second supporting portion 122 may less than the thickness t22 of the optical system 600 corresponding to the first supporting portion 121.

As such, for the purpose of providing an overall uniform luminance and increasing the amount of the light in the already set reference direction, the thickness of the optical system 600 may be variously changed according to the design conditions of the light source module required by an object to be mounted.

Figure 27:
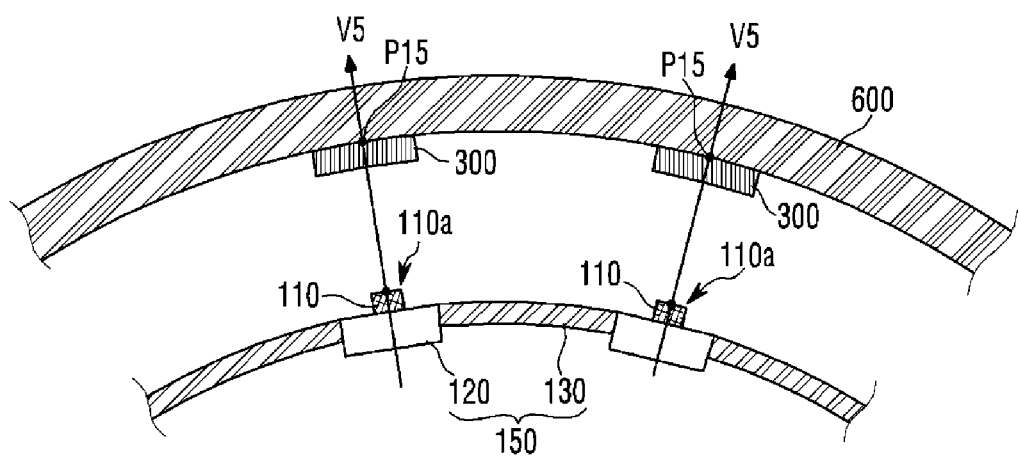
FIG. 27 is a cross sectional view showing a reflector of the optical system.

FIG. 27 is a cross sectional view showing a reflector of the optical system.

Referring to FIG. 27, the optical system 600 may be disposed apart from the substrate 150 by a predetermined distance. The light mixing area may be formed in the space between the substrate 150 and the optical system 600.

The light source module may include the substrate 150 and a plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

Here, when a fifth vertical line V5 passing through any one point of the light emitting surface 110a of the light source 110 passes through a point P15 of the optical system 600, a reflector 300 may be disposed on the point P15 of the optical system 600.

As such, the reflector 300 is formed in the area of the optical system 600, which corresponds to the light emitting surface 110a of the light source 110, because a hot spot is expected to occur, where a strong luminance appears at an area where the light source 110 is located.

Here, the reflector 300 of the optical system 600 may be comprised of metal or metal oxide which has a high reflectance, for example, Cr, Al, Ag, Au, $TiO_2$ and the like.

As such, for the purpose of providing an overall uniform luminance, the reflector of the optical system 600 may be variously changed according to the design conditions of the light source module required by an object to be mounted and the embodiment.

Figure 28A:
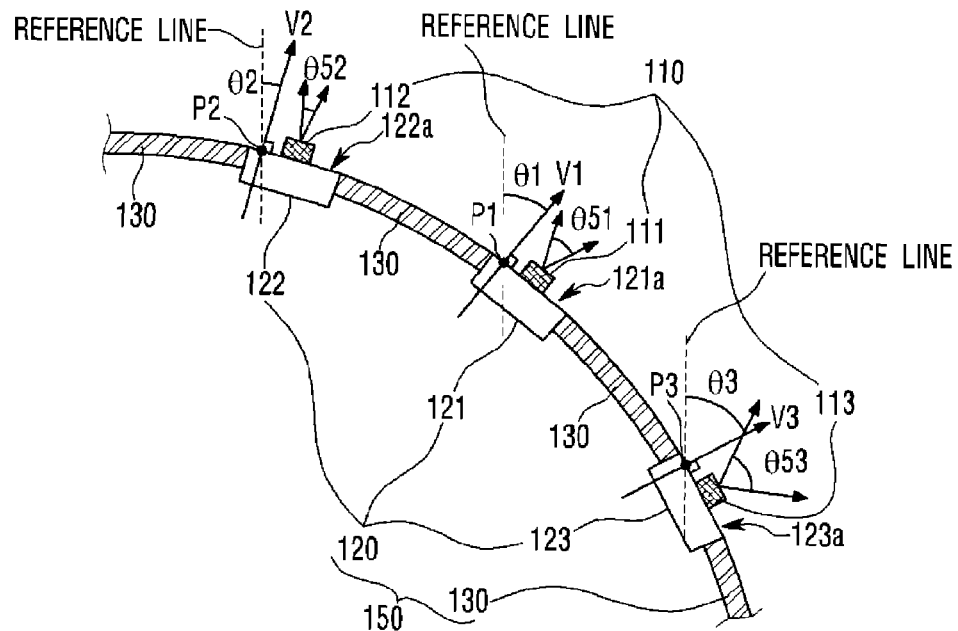
FIGS. 28a and 28b are cross sectional views showing the arrangement of the light source modules according to a sixth embodiment.
Figure 28B:
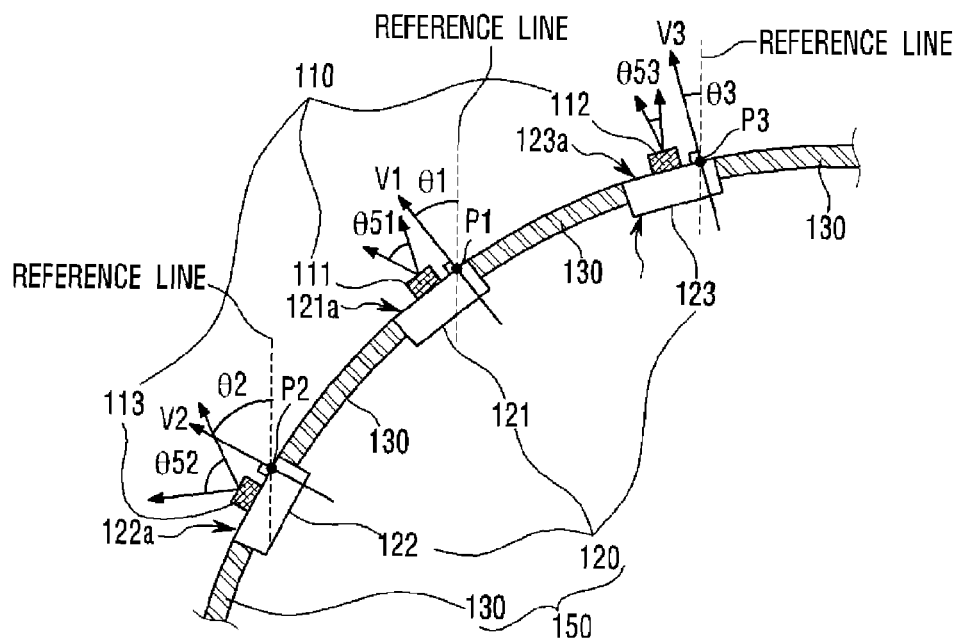

FIGS. 28a and 28b are cross sectional views showing the arrangement of the light source modules according to a sixth embodiment.

Referring to FIGS. 28a and 28b, the light source module may include the substrate 150 and a plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Here, the plurality of the light sources 110 may include the first light source 111, the second light source 112 and the third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that the first vertical line V1 passing through the first point P1 of the surface 121a of the first supporting portion 121, which faces the first light source 111, has the first angle of θ1 with respect to the reference line facing toward the already set reference direction.

Here, the already set reference direction may mean a direction which is used to measure the amount or intensity of light generated from the plurality of the light sources 110.

The second supporting portion 122 may be disposed such that the second vertical line V2 passing through the second point P2 of the surface 122a of the second supporting portion 122, which faces the second light source 112, has the second angle of θ2 with respect to the reference line.

The third supporting portion 123 may be disposed such that the third vertical line V3 passing through the third point P3 of the surface 123a of the third supporting portion 123, which faces the third light source 113, has the third angle of θ3 with respect to the reference line.

Here, as shown in FIG. 28a, when the second angle of θ2 of the second supporting portion 122 is less than the first angle of θ1 of the first supporting portion 121 and the third angle of θ3 of the third supporting portion 123, a beam angle θ52 of the second light source 112 supported by the second supporting portion 122 may be less than a beam angle θ51 of the first light source 111 and a beam angle θ53 of the third light source 113.

Also, as shown in FIG. 28b, when the second angle of θ2 of the second supporting portion 122 is greater than the first angle of θ1 of the first supporting portion 121 and the third angle of θ3 of the third supporting portion 123, a beam angle θ52 of the second light source 112 supported by the second supporting portion 122 may be greater than a beam angle θ51 of the first light source 111 and a beam angle θ53 of the third light source 113.

For example, the beam angles of the light sources disposed on the supporting portions where an angle between the reference line facing toward the already set reference direction and a vertical line passing through any one point of the surface of the supporting portion facing the light source is from about 0 to 45 degree may be less than the beam angles of the light sources disposed on the supporting portions where an angle between the reference line facing toward the already set reference direction and a vertical line passing through any one point of the surface of the supporting portion facing the light source is from 45.1 to 90 degree.

As such, the beam angle of the light source is changed according to the position thereof in order to provide an overall uniform luminance and to increase the amount of the light in the already set reference direction. The beam angle of the light source may be variously changed according to the design conditions of the light source module required by an object to be mounted.

Figure 29A:
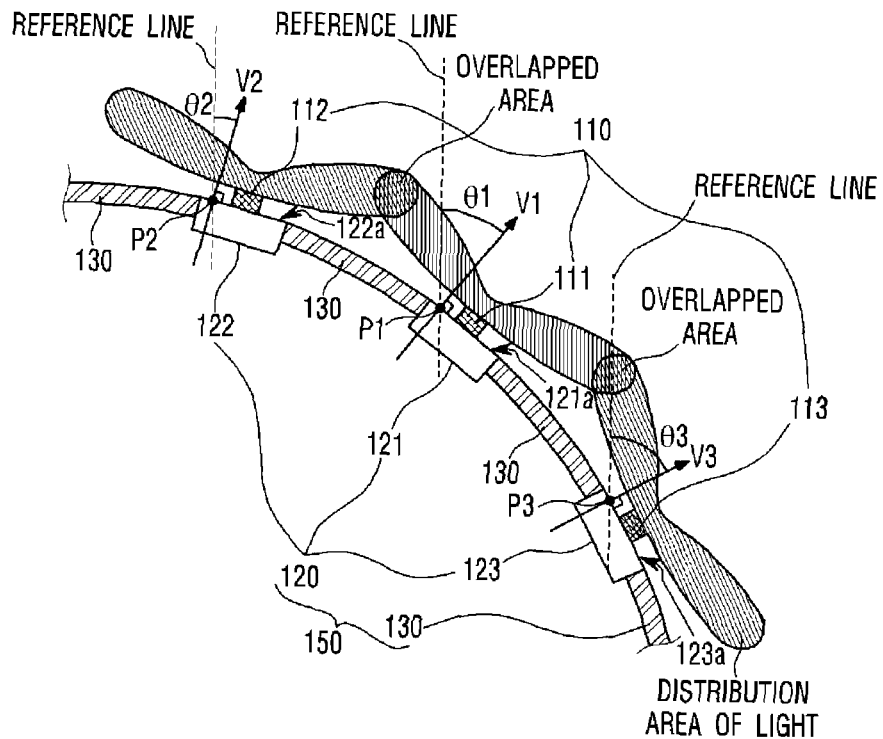
FIGS. 29a and 29b are cross sectional views showing the arrangement of the light source modules according to a seventh embodiment.
Figure 29B:
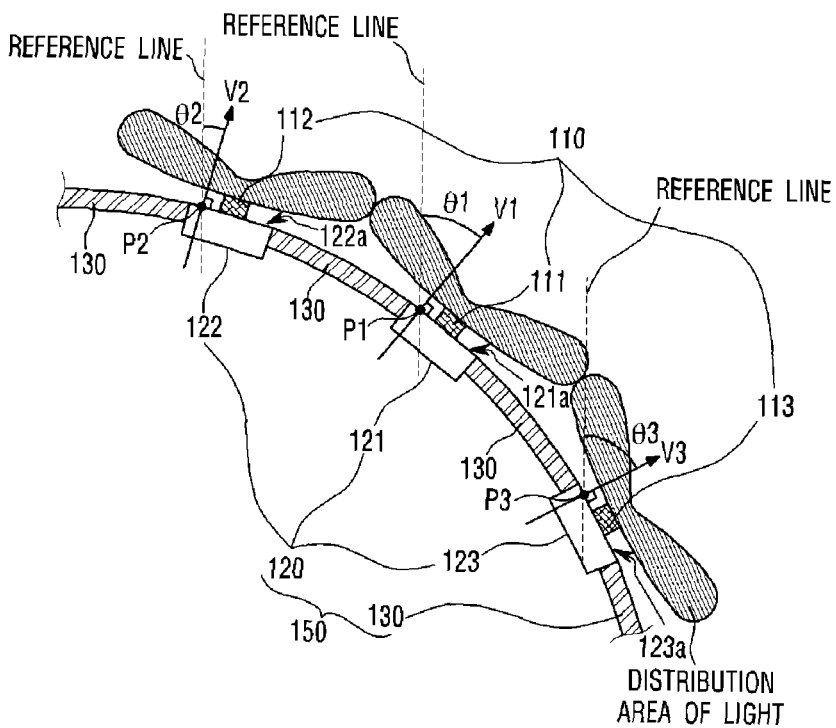

FIGS. 29a and 29b are cross sectional views showing the arrangement of the light source modules according to a seventh embodiment.

As shown in FIGS. 29a and 29b, the light source module may include the substrate 150 and the plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Here, the plurality of the light sources 110 may include the first light source 111, the second light source 112 and the third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that the first vertical line V1 passing through the first point P1 of the surface 121a of the first supporting portion 121, which faces the first light source 111, has the first angle of θ1 with respect to the reference line facing toward the already set reference direction.

Here, the already set reference direction may mean a direction which is used to measure the amount or intensity of light generated from the plurality of the light sources 110.

The second supporting portion 122 may be disposed such that the second vertical line V2 passing through the second point P2 of the surface 122a of the second supporting portion 122, which faces the second light source 112, has the second angle of θ2 with respect to the reference line.

The third supporting portion 123 may be disposed such that the third vertical line V3 passing through the third point P3 of the surface 123a of the third supporting portion 123, which faces the third light source 113, has the third angle of θ3 with respect to the reference line.

As shown in FIG. 29a, a distribution area of the light emitted from the first light source 111 may be partially overlapped with a distribution area of the light emitted from the second light source 112 or the third light source 113. If the overlapping does not occur, a dark portion may be generated in the lamp unit. If excessive overlapping occurs, a bright line may be generated in the lamp unit.

Here, the overlapped area may be less than about 0.2 times as much as the entire distribution area of the light emitted from the first light source 111.

If the overlapped area exceeds about 0.2 times as much as the entire distribution area of the light emitted from the first light source 111, a hot spot is expected to occur, where a strong luminance appears at the overlapped area.

As shown in FIG. 29b, the distribution area of the light emitted from the first light source 111 may partially contact with the distribution area of the light emitted from the second light source 112 or the third light source 113.

Here, the distribution area of the light emitted from the first light source 111 may include a first contact point P61 which contacts with the distribution area of the light emitted from the second light source 112, and a second contact point P62 which contacts with the distribution area of the light emitted from the third light source 113.

As such, the distribution area of the light from the light source module can be variously according to the structures of the light source, the lens and the like. It is possible to provide an overall uniform luminance without hot spot.

The distribution area of the light from the light source module may be variously changed according to the design conditions of the light source module required by an object to be mounted.

Figure 30:
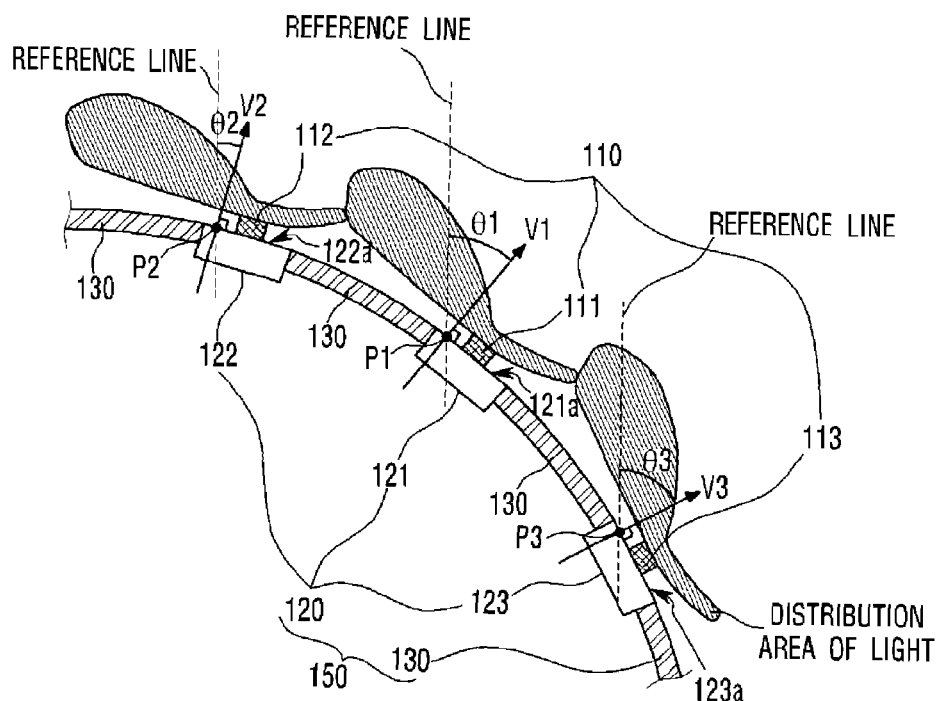
FIG. 30 is a cross sectional view showing the arrangement of the light source modules according to an eighth embodiment.

FIG. 30 is a cross sectional view showing the arrangement of the light source modules according to an eighth embodiment.

Referring to FIG. 30, the light source module may include the substrate 150 and a plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Here, the plurality of the light sources 110 may include the first light source 111, the second light source 112 and the third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that the first vertical line V1 passing through the first point P1 of the surface 121a of the first supporting portion 121, which faces the first light source 111, has the first angle of θ1 with respect to the reference line facing toward the already set reference direction.

Here, the already set reference direction may mean a direction which is used to measure the amount or intensity of light generated from the plurality of the light sources 110.

The second supporting portion 122 may be disposed such that the second vertical line V2 passing through the second point P2 of the surface 122a of the second supporting portion 122, which faces the second light source 112, has the second angle of θ2 with respect to the reference line.

The third supporting portion 123 may be disposed such that the third vertical line V3 passing through the third point P3 of the surface 123a of the third supporting portion 123, which faces the third light source 113, has the third angle of θ3 with respect to the reference line.

Here, as shown in FIG. 30, the distribution area of the light emitted from the first light source 111 may partially contact with the distribution area of the light emitted from the second light source 112 or the third light source 113.

Here, the distribution area of the light emitted from the first light source 111 may include the first contact point P61 which contacts with the distribution area of the light emitted from the second light source 112, and the second contact point P62 which contacts with the distribution area of the light emitted from the third light source 113.

Here, when the first angle of θ1 of the first supporting portion 121 is greater than the second angle of θ2 of the second supporting portion 122 and is less than the third angle of θ3 of the third supporting portion 123, the light intensity of the area in which the first contact point P61 is located may be greater than the light intensity of the area in which the second contact point P62 is located.

The light source module having the light distribution area is disposed. This intends to transfer a large amount of the light in the already set reference direction.

Here, the already set reference direction is a direction which is used to measure the amount or intensity of light generated from the plurality of the light sources 110. When an object to be applied requires predetermined conditions, for example, the amount or intensity of the light emitted in a particular direction, the light distribution areas of the light sources 110 can be controlled according to the requirements.

For example, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 $cm^2$. For example, the brightness for a brake lamp should be about 40 to 45 candela (cd).

Accordingly, with regard to the light source module, in the distribution area of the light emitted from the first light source 111, the light distribution areas of the light sources 110 are controlled such that the light intensity of an area adjacent to the distribution area of the light emitted from the second light source 112 is greater than the light intensity of an area adjacent to the distribution area of the light emitted from the third light source 113, so that the conditions, for example, the amount or intensity of the light can be satisfied in the already set reference direction.

Figure 31:
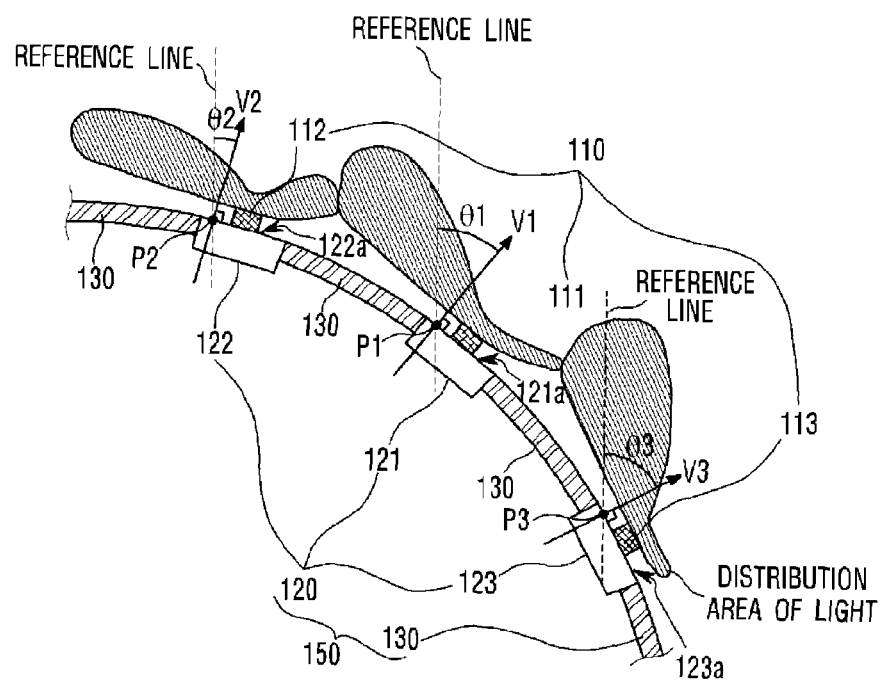
FIG. 31 is a cross sectional view showing the arrangement of the light source modules according to a ninth embodiment.

FIG. 31 is a cross sectional view showing the arrangement of the light source modules according to a ninth embodiment.

Referring to FIG. 31, the light source module may include the substrate 150 and a plurality of the light sources 110 disposed on the substrate 150.

Here, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

The plurality of the supporting portions 120 may include the first supporting portion 121, the second supporting portion 122 and the third supporting portion 123. The second supporting portion 122 may be disposed on one side of the first supporting portion 121. The third supporting portion 123 may be disposed on the other side of the first supporting portion 121.

Here, the plurality of the light sources 110 may include the first light source 111, the second light source 112 and the third light source 113. The first light source 111 may be supported by the first supporting portion 121. The second light source 112 may be supported by the second supporting portion 122. The third light source 113 may be supported by the third supporting portion 123.

The first supporting portion 121 may be disposed such that the first vertical line V1 passing through the first point P1 of the surface 121a of the first supporting portion 121, which faces the first light source 111, has the first angle of θ1 with respect to the reference line facing toward the already set reference direction.

Here, the already set reference direction may mean a direction which is used to measure the amount or intensity of light generated from the plurality of the light sources 110.

The second supporting portion 122 may be disposed such that the second vertical line V2 passing through the second point P2 of the surface 122a of the second supporting portion 122, which faces the second light source 112, has the second angle of θ2 with respect to the reference line.

The third supporting portion 123 may be disposed such that the third vertical line V3 passing through the third point P3 of the surface 123a of the third supporting portion 123, which faces the third light source 113, has the third angle of θ3 with respect to the reference line.

Subsequently, as shown in FIG. 31, the distribution area of the light emitted from the light source may include a first light distribution area adjacent to the direction of the reference line, and a second light distribution area away from the direction of the reference line.

Here, the intensity or amount of the light of the first light distribution area adjacent to the direction of the reference line may be greater than the intensity or amount of the light of the second light distribution area away from the direction of the reference line.

Also, the intensity or amount of the light of the first light distribution area adjacent to the direction of the reference line may be gradually increased with the increase of the angle between the reference line facing toward the already set reference direction and a vertical line passing through any one point of the surface of the supporting portion facing the light source.

Also, the intensity or amount of the light of the second light distribution area away from the direction of the reference line may be gradually reduced with the increase of the angle between the reference line facing toward the already set reference direction and a vertical line passing through any one point of the surface of the supporting portion facing the light source.

As such, with the increase of the angle between the reference line facing toward the already set reference direction and a vertical line passing through any one point of the surface of the supporting portion facing the light source, the intensity or amount of the light of the first light distribution area adjacent to the direction of the reference line is gradually increased, and the intensity or amount of the light of the second light distribution area away from the direction of the reference line is gradually reduced. This intends to provide uniform luminance in the already set reference direction which is used to measure the amount or intensity of light generated from the plurality of the light sources 110.

For example, in a case where the first supporting portion 121 may be disposed such that a first vertical line V1 passing through a first point P1 of the surface 121a of the first supporting portion 121, which faces the first light source 111, has a first angle of θ1 with respect to the reference line facing toward the already set reference direction, and in a case where the second supporting portion 122 may be disposed such that a second vertical line V2 passing through a second point P2 of the surface 122a of the second supporting portion 122, which faces the second light source 112, has a second angle of θ2 with respect to the reference line, when the second angle of θ2 is less than the first angle of θ1, the intensity or amount of the light of the first light distribution area corresponding to the first light source 111 may be greater than the intensity or amount of the light of the first light distribution area corresponding to the second light source 112, and the intensity or amount of the light of the second light distribution area corresponding to the first light source 111 may be greater than the intensity or amount of the light of the second light distribution area corresponding to the second light source 112.

Figure 32:
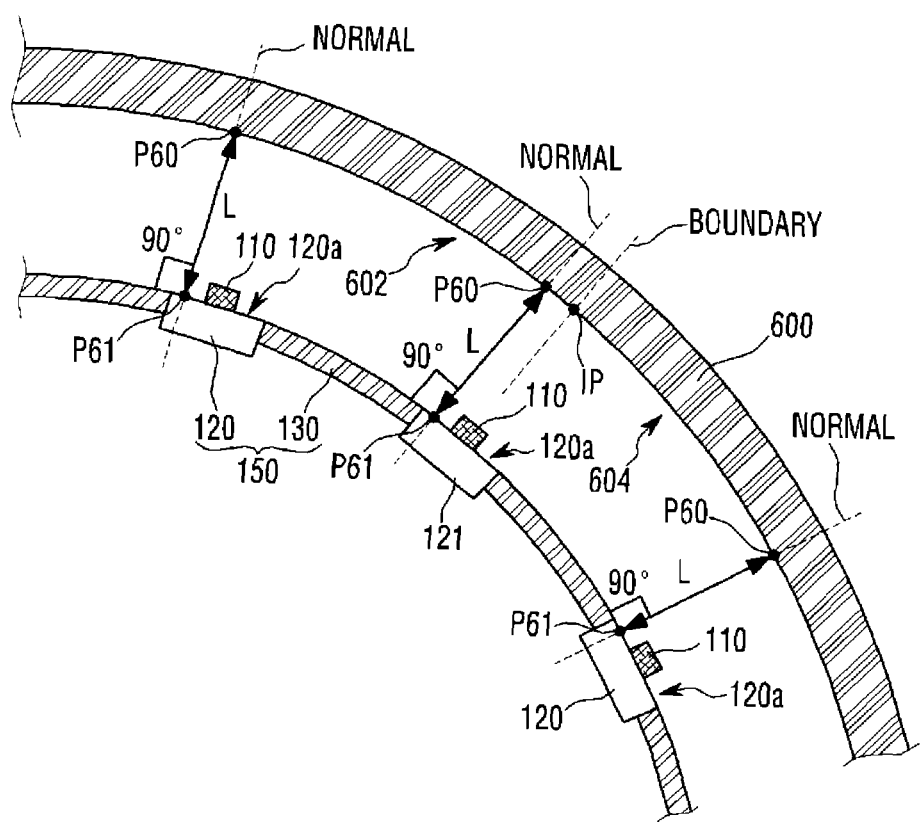
FIG. 32 is a cross sectional view showing the arrangement of the light source modules according to a tenth embodiment.

FIG. 32 is a cross sectional view showing the arrangement of the light source modules according to a tenth embodiment.

Referring to FIG. 32, the optical system 600 may be disposed apart from the substrate 150 by a predetermined distance. The light mixing area may be formed in the space between the substrate 150 and the optical system 600.

Here, the optical system 600 may include at least two inclined surfaces having at least one inflection point IP.

For example, the optical system 600 may be divided into a first inclined surface 602 and a second inclined surface 604 by a boundary of the inflection point IP.

Here, the first inclined surface 602 of the optical system 600 may have the first curvature radius, and the second inclined surface 604 of the optical system 600 may have the second curvature radius. The first curvature radius and the second curvature radius may be different from each other.

The light source module may include the substrate 150 and a plurality of the light sources 110 disposed on the substrate 150.

Subsequently, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

Here, the supporting portion 120 of the substrate 150 has a surface perpendicular to a normal line passing through any one point on the surface of the optical system 600, and the lengths L of the normal lines corresponding to the supporting portions 120 of the substrates 150 respectively are the same as each other. However, there is no limit to this. In some cases, at least any one of the lengths of the normal lines corresponding to the supporting portions 120 of the substrates 150 respectively may be different from the others.

In other words, the normal line passing through any one point P60 on the surface of the optical system 600 may pass through any one point P61 of the surface 120a of the supporting portion 120 of the substrate 150 and may be perpendicular to the surface 120a of the supporting portion 120 of the substrate 150.

Here, the length L between the point P60 on the surface of the optical system 600 and the point P61 on the surface 120a of the supporting portion 120 of the substrate 150 may be greater than about 10 mm.

For example, the length L between the point P60 on the surface of the optical system 600 and the point P61 on the surface 120a of the supporting portion 120 of the substrate 150 may be greater than about 10 mm to 50 cm.

If the length L between the point P60 on the surface of the optical system 600 and the point P61 on the surface 120a of the supporting portion 120 of the substrate 150 is less than about 10 mm, the lamp unit does not have uniform luminance and a hot spot may occur where a strong luminance appears at an area where the light source 110 is located.

Also, if the length L between the point P60 on the surface of the optical system 600 and the point P61 on the surface 120a of the supporting portion 120 of the substrate 150 is greater than about 50 cm, the lamp unit has a weak luminance, so that the lamp unit is unable to perform its function.

Figure 33:
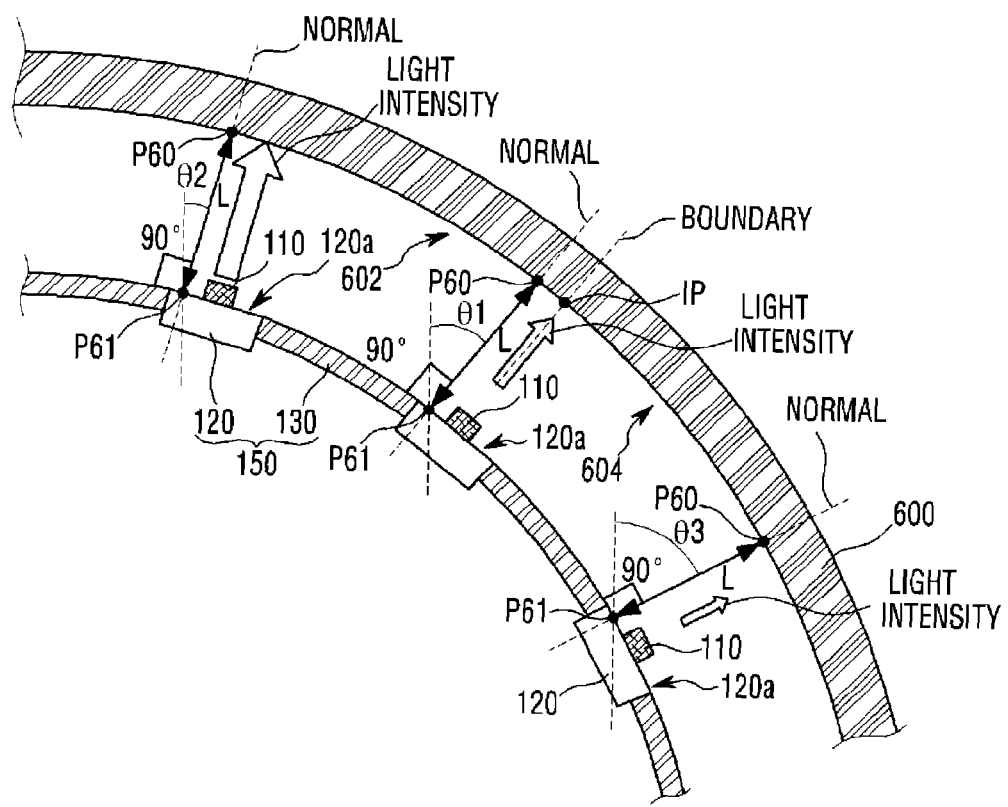
FIG. 33 is a cross sectional view showing the arrangement of the light source modules according to an eleventh embodiment.

FIG. 33 is a cross sectional view showing the arrangement of the light source modules according to an eleventh embodiment.

Referring to FIG. 33, the optical system 600 may be disposed apart from the substrate 150 by a predetermined distance. The light mixing area may be formed in the space between the substrate 150 and the optical system 600.

Here, the optical system 600 may include at least two inclined surfaces having at least one inflection point IP.

For example, the optical system 600 may be divided into the first inclined surface 602 and the second inclined surface 604 by a boundary of the inflection point IP.

Here, the first inclined surface 602 of the optical system 600 may have the first curvature radius, and the second inclined surface 604 of the optical system 600 may have the second curvature radius. The first curvature radius and the second curvature radius may be different from each other.

The light source module may include the substrate 150 and a plurality of the light sources 110 disposed on the substrate 150.

Subsequently, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

Here, the supporting portion 120 of the substrate 150 has a surface perpendicular to a normal line passing through any one point on the surface of the optical system 600, and the lengths L of the normal lines corresponding to the supporting portions 120 of the substrates 150 respectively are the same as each other.

In other words, the normal line passing through any one point P60 on the surface of the optical system 600 may pass through any one point P61 of the surface 120a of the supporting portion 120 of the substrate 150 and may be perpendicular to the surface 120a of the supporting portion 120 of the substrate 150.

Here, the length L between the point P60 on the surface of the optical system 600 and the point P61 on the surface 120a of the supporting portion 120 of the substrate 150 may be greater than about 10 mm.

Subsequently, the normal line corresponding to the supporting portion 120 of the substrate 150 forms a predetermined angle with the reference line facing toward the already set reference direction. The light intensity of the light source 110 disposed on the supporting portion 120 of the substrate 150, where the angle between the reference line and the normal line is minimum, may be greater than the light intensity of the light source 110 disposed on the supporting portion 120 of the substrate 150, where the angle between the reference line and the normal line is maximum.

The light source module is disposed in this manner in order to transfer a large amount of the light in the already set reference direction.

Here, the already set reference direction is a direction which is used to measure the amount or intensity of light generated from the plurality of the light sources 110. When an object to be applied requires predetermined conditions, for example, the amount or intensity of the light emitted in a particular direction, the light source 110 having different light intensity may be disposed according to the requirements.

For example, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 $cm^2$. For example, the brightness for a brake lamp should be about 40 to 45 candela (cd).

Accordingly, in the light source module, the light source 110 having higher light intensity is disposed on the supporting portion 120 where the angle between the reference line and the normal line is minimum, and the light source 110 having lower light intensity is disposed on the supporting portion 120 where the angle between the reference line and the normal line is maximum. As a result, the conditions, for example, the amount or intensity of the light can be satisfied in the already set reference direction.

Figure 34:
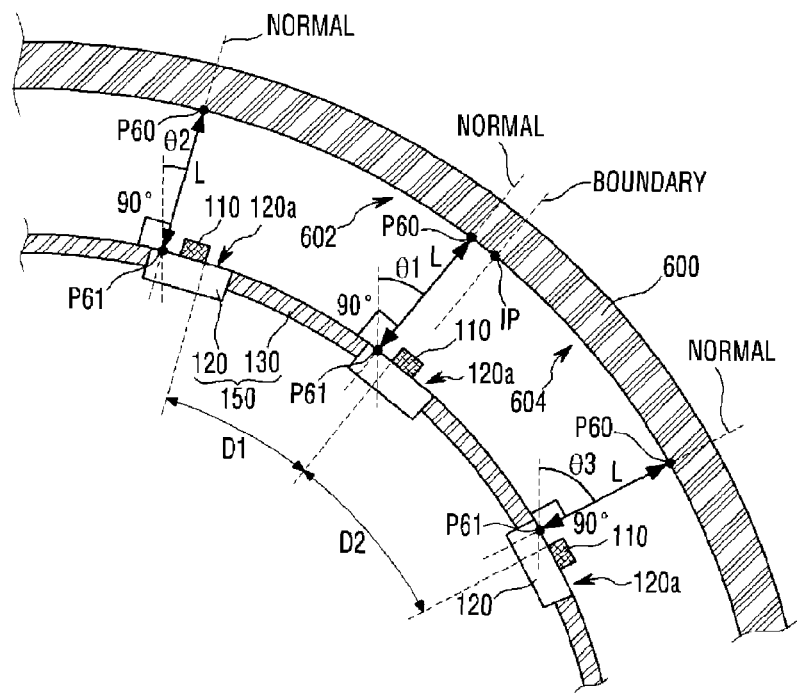
FIG. 34 is a cross sectional view showing the arrangement of the light source modules according to a twelfth embodiment.

FIG. 34 is a cross sectional view showing the arrangement of the light source modules according to a twelfth embodiment.

Referring to FIG. 34, the optical system 600 may be disposed apart from the substrate 150 by a predetermined distance. The light mixing area may be formed in the space between the substrate 150 and the optical system 600.

Here, the optical system 600 may include at least two inclined surfaces having at least one inflection point IP.

For example, the optical system 600 may be divided into a first inclined surface 602 and a second inclined surface 604 by a boundary of the inflection point IP.

Here, the first inclined surface 602 of the optical system 600 may have the first curvature radius, and the second inclined surface 604 of the optical system 600 may have the second curvature radius. The first curvature radius and the second curvature radius may be different from each other.

The light source module may include the substrate 150 and a plurality of the light sources 110 disposed on the substrate 150.

Subsequently, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

Here, the supporting portion 120 of the substrate 150 has a surface perpendicular to a normal line passing through any one point on the surface of the optical system 600, and the lengths L of the normal lines corresponding to the supporting portions 120 of the substrates 150 respectively are the same as each other.

In other words, the normal line passing through any one point P60 on the surface of the optical system 600 may pass through any one point P61 of the surface 120a of the supporting portion 120 of the substrate 150 and may be perpendicular to the surface 120a of the supporting portion 120 of the substrate 150.

Here, the length L between the point P60 on the surface of the optical system 600 and the point P61 on the surface 120a of the supporting portion 120 of the substrate 150 may be greater than about 10 mm.

Subsequently, the normal line corresponding to the supporting portion 120 of the substrate 150 forms a predetermined angle with the reference line facing toward the already set reference direction. The distance D1 between the light sources 110 disposed on the supporting portion 120 of the substrate 150, where the angle between the reference line and the normal line is from about 0 to 45 degree may be less than the distance D2 between the light sources 110 disposed on the supporting portion 120 of the substrate 150, where the angle between the reference line and the normal line is from about 45.1 to 90 degree.

The light source module is disposed in this manner in order to transfer a large amount of the light in the already set reference direction.

Here, the already set reference direction is a direction which is used to measure the amount or intensity of light generated from the plurality of the light sources 110. When an object to be applied requires predetermined conditions, for example, the amount or intensity of the light emitted in a particular direction, the light source 110 having different light intensity may be disposed according to the requirements.

For example, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 $cm^2$. For example, the brightness for a brake lamp should be about 40 to 45 candela (cd).

Accordingly, in the light source module, the arrangement density of the light sources 110 disposed on the supporting portion 120 where the angle between the reference line and the normal line is from about 0 to 45 degree is increased and the arrangement density of the light sources 110 disposed on the supporting portion 120 where the angle between the reference line and the normal line is from about 45.1 to 90 degree is decreased. As a result, the conditions, for example, the amount or intensity of the light can be satisfied in the already set reference direction.

Figure 35:
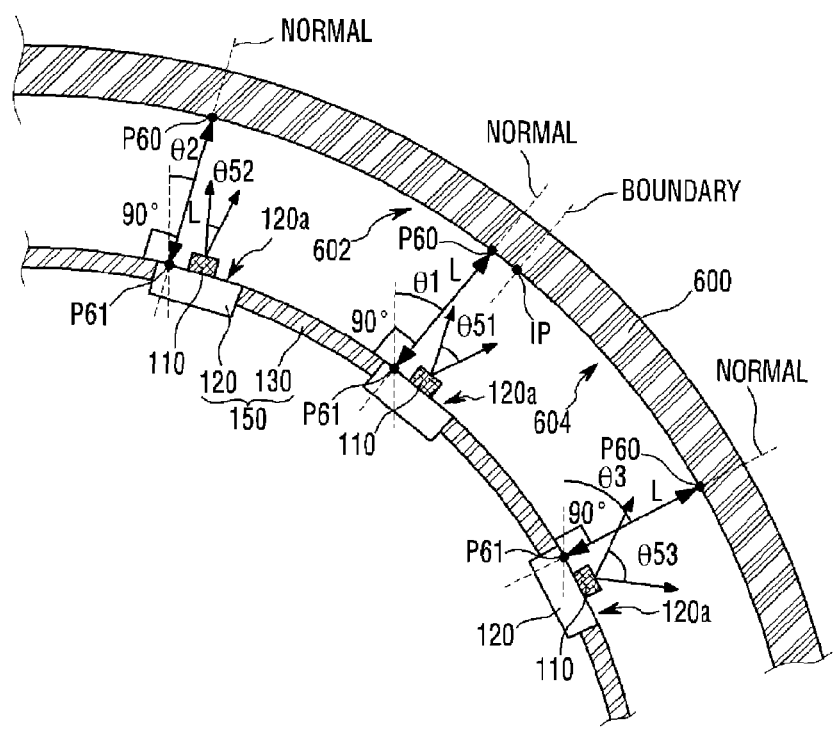
FIG. 35 is a cross sectional view showing the arrangement of the light source modules according to a thirteenth embodiment.

FIG. 35 is a cross sectional view showing the arrangement of the light source modules according to a thirteenth embodiment.

Referring to FIG. 35, the optical system 600 may be disposed apart from the substrate 150 by a predetermined distance. The light mixing area may be formed in the space between the substrate 150 and the optical system 600.

Here, the optical system 600 may include at least two inclined surfaces having at least one inflection point IP.

For example, the optical system 600 may be divided into a first inclined surface 602 and a second inclined surface 604 by a boundary of the inflection point IP.

Here, the first inclined surface 602 of the optical system 600 may have the first curvature radius, and the second inclined surface 604 of the optical system 600 may have the second curvature radius. The first curvature radius and the second curvature radius may be different from each other.

The light source module may include the substrate 150 and a plurality of the light sources 110 disposed on the substrate 150.

Subsequently, the substrate 150 may include a plurality of the supporting portions 120 and a plurality of the connecting portions 130. The supporting portion 120 may be disposed corresponding to each of the light sources 110. The connecting portion 130 may be disposed between the adjacent supporting portions 120.

Here, the supporting portion 120 of the substrate 150 has a surface perpendicular to a normal line passing through any one point on the surface of the optical system 600, and the lengths L of the normal lines corresponding to the supporting portions 120 of the substrates 150 respectively are the same as each other.

In other words, the normal line passing through any one point P60 on the surface of the optical system 600 may pass through any one point P61 of the surface 120a of the supporting portion 120 of the substrate 150 and may be perpendicular to the surface 120a of the supporting portion 120 of the substrate 150.

Here, the length L between the point P60 on the surface of the optical system 600 and the point P61 on the surface 120a of the supporting portion 120 of the substrate 150 may be greater than about 10 mm.

Subsequently, the normal line corresponding to the supporting portion 120 of the substrate 150 forms a predetermined angle with the reference line facing toward the already set reference direction. The beam angle of the light source 110 disposed on the supporting portion 120 of the substrate 150, where the angle between the reference line and the normal line is minimum, may be less than the beam angle of the light source 110 disposed on the supporting portion 120 of the substrate 150, where the angle between the reference line and the normal line is maximum.

As such, the light source module is disposed in this manner in order to provide an overall uniform luminance and to increase the amount of the light in the already set reference direction. The light sources may be variously disposed according to the design conditions of the light source module required by an object to be mounted.

Figure 36:
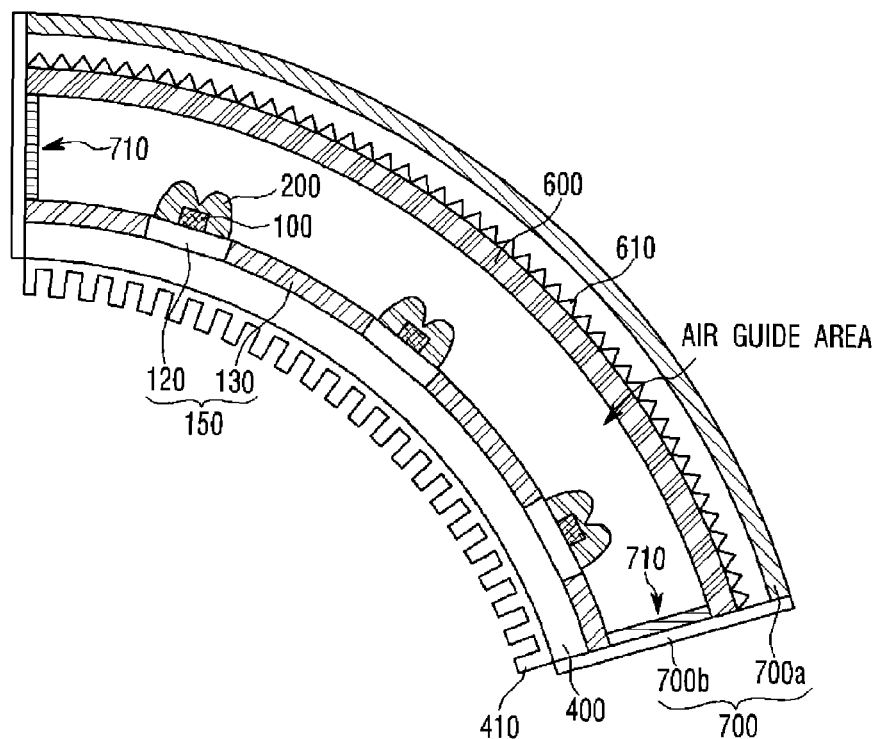
FIG. 36 is a cross sectional view showing the lamp unit for a vehicle according to the embodiment.

FIG. 36 is a cross sectional view showing the lamp unit for a vehicle according to the embodiment.

Referring to FIG. 36, the lamp unit may include the light source module including the substrate 150 and the light source 110, the heat radiating member 400, the optical system 600 and the cover member 700.

Here, the light source module may include the substrate including electrode patterns, and a plurality of the light sources 110 disposed on the substrate 150.

The substrate 150 of the light source module may include the plurality of the supporting portions 120 disposed corresponding to the light sources 110 respectively and may include the connecting portions 130 disposed between the adjacent supporting portions 120.

Here, the supporting portion 120 and the connecting portion 130 of the substrate 150 are integrally formed with each other by using a bendable material. Otherwise, the supporting portion 120 of the substrate 150 is formed of a hard and unbendable material in order to support the light source 110, and the connecting portion 130 of the substrate 150 is formed separately from the supporting portion 120 by using a flexible and bendable material. Accordingly, the substrate 150 of the light source module can be manufactured to be applied to the vehicle lighting equipment which has a curvature.

In some cases, the supporting portion 120 of the substrate 150 may have the first thickness, and the connecting portion 130 of the substrate 150 may have the second thickness. The first thickness and the second thickness may be manufactured to be different from each other, so that the substrate 150 may be flexible.

For example, when the second thickness of the connecting portion 130 of the substrate 150 is less than the first thickness of the supporting portion 120 of the substrate 150, the substrate 150 may be flexible by the connecting portion 130 of the substrate 150, so that the substrate 150 of the light source module can be applied to the vehicle lighting equipment which has a curvature.

Also, the substrate 150 of the light source module may be disposed at a predetermined angle with respect to the reference line facing toward the already set reference direction.

Here, the already set reference direction is a direction which is used to measure the amount or intensity of light generated from the plurality of the light sources 110.

That is, with regard to the lamp unit applied to the tail lamp unit of the vehicle, according to the safety standards for the lamp unit applied to the tail light unit for the vehicle, as viewed from the external axis of the vehicle at a horizontal angle of 45 degree with respect to the central point of light, the tail lamp unit should have a projection area greater than about 12.5 cm$^2$. For example, the brightness for a brake lamp should be about 40 to 45 candela (cd).

Therefore, in the lamp unit, for example, the brightness for a brake lamp should be about 40 to 45 candela (cd) in the already set reference direction.

Thus, the design may be performed such that the supporting portion 120 of the substrate 150 has a surface perpendicular to a normal line passing through any one point on the surface of the optical system 600, and the lengths of the normal lines corresponding to the supporting portions 120 of the substrates 150 respectively are the same as each other.

In some cases, it may be designed such that the supporting portion 120 of the substrate 150 is disposed such that a vertical line passing through any one point of the surface of the supporting portion 120 facing the light source 110 forms a predetermined angle with the reference line facing toward the already set reference direction, and additionally it may be designed such that the light intensities of the light sources 110 disposed on the supporting portions 120 where an angle between the reference line facing toward the already set reference direction and a vertical line passing through any one point of the surface of the supporting portion 120 facing the light source 110 is from about 0 to 45 degree may be greater than the light intensities of the light sources 110 disposed on the supporting portions 120 where an angle between the reference line facing toward the already set reference direction and a vertical line passing through any one point of the surface of the supporting portion 120 facing the light source 110 is from about 45.1 to 90 degree.

For another example, it may be designed such that the supporting portion 120 of the substrate 150 is disposed such that a vertical line passing through any one point of the surface of the supporting portion 120 facing the light source 110 forms a predetermined angle with the reference line facing toward the already set reference direction, and additionally it may be designed such that the densities of the light sources 110 disposed on the supporting portions 120 where an angle between the reference line facing toward the already set reference direction and a vertical line passing through any one point of the surface of the supporting portion 120 facing the light source 110 is from about 0 to 45 degree may be greater than the densities of the light sources 110 disposed on the supporting portions 120 where an angle between the reference line facing toward the already set reference direction and a vertical line passing through any one point of the surface of the supporting portion 120 facing the light source 110 is from about 45.1 to 90 degree.

For another example, it may be designed such that the supporting portion 120 of the substrate 150 is disposed such that a vertical line passing through any one point of the surface of the supporting portion 120 facing the light source 110 forms a predetermined angle with the reference line facing toward the already set reference direction, and additionally it may be designed such that the beam angles of the light sources 110 disposed on the supporting portions 120 where an angle between the reference line facing toward the already set reference direction and a vertical line passing through any one point of the surface of the supporting portion 120 facing the light source 110 is from about 0 to 45 degree may be less than the beam angles of the light sources 110 disposed on the supporting portions 120 where an angle between the reference line facing toward the already set reference direction and a vertical line passing through any one point of the surface of the supporting portion 120 facing the light source 110 is from about 45.1 to 90 degree.

Subsequently, the light source 110 of the light source module may include the lens 200. The lens 200 may include the recess formed on a position corresponding to the central area of the light emitting surface of the light source 110.

Here, in the cross section of the recess may have a conical shape or a trapezoidal shape, of which the upper surface is large and the lower surface is small.

As such, the recess is formed in the lens 200 in order to increase the beam angle of the light emitted from the light source 110. The embodiment is not limited to this and lenses having various shapes can be used in the embodiment.

The optical system 600 may be disposed apart from the substrate 150 by a predetermined distance. The light mixing area may be formed in the space between the substrate 150 and the optical system 600.

Here, without the cover member 700, and the optical system 600 is able to function as the cover member 700.

In some cases, without the optical system 600, and only the cover member 700 may be provided.

The optical system 600 is comprised of at least one sheet. The optical system 600 may selectively include a diffusion sheet, a prism sheet and a brightness enhancement sheet, and the like.

Here, the diffusion sheet diffuses the light emitted from the light source 110. The prism sheet guides the diffused light to the light emitting area. The brightness enhancement sheet enhances the brightness.

The optical system 600 may have the unevenness pattern 610 on the upper surface thereof.

The optical system 600 functions to diffuse the light emitted from the light source module. In order to increase the diffusion effect, the unevenness pattern 610 may be formed on the upper surface.

In other words, the optical system 600 may be comprised of several layers. The unevenness pattern 610 may be formed on the surface of the top layer or on the surface of any one layer.

The unevenness pattern 610 may have a strip shape which is arranged in one direction.

The optical system 600 may include at least two inclined surfaces having at least one inflection point in order to fit the shape of the vehicle lamp.

The normal line passing through any one point on the surface of the optical system 600 may be perpendicular to the surface of the supporting portion 120 of the substrate 150. It may be designed that the lengths of all the normal lines corresponding to the supporting portions 120 of the substrates 150 respectively are the same as each other.

For example, when a vertical line passing through any one point of the surface of the supporting portion 120 of the substrate 150 passes through any one point of the optical system 600, a distance between the corresponding point of the optical system 600 and the surface of the supporting portion 120 may be greater than about 10 mm.

If the distance between the corresponding point of the optical system 600 and the surface of the supporting portion 120 is less than about 10 mm, the lamp unit does not have uniform luminance and a hot spot may occur where a strong luminance appears at an area where the light source 110 is located Subsequently, the heat radiating member 400 including the plurality of heat radiating fins may be disposed under the substrate 150 of the light source module.

Here, the heat radiating member 400 is able to outwardly radiate heat generated from the light source 110.

However, when the heat radiating member 400 is disposed on the lower surface of the substrate 150 of the light source module, the heat generated from the light source 110 can be efficiently radiated to the outside, so that the temperature rise of the light source 110 can be suppressed. As a result, it is possible to prevent the luminous intensity of the light source 110 from being reduced and to prevent the wavelength shift of the light source 110 from occurring.

Next, the cover member 700 may include the top cover 700a and the side cover 700b. The top cover 700a may be formed of a light transmitting material. The side cover 700b may be formed of an opaque material.

In some cases, both the top cover 700a and the side cover 700b may be formed of a light transmitting material.

Here, the cover member 700 protects the light source module including the substrate 150 and the light source 110 from an external impact and may be formed of a material through which the light irradiated from the light source module transmits (for example, acryl).

The cover member 700 may include a curved portion in terms of design. Since the substrate 150 of the light source module is flexible, the substrate 150 can be easily received in the cover member 700.

Subsequently, the reflector 710 may be disposed on the inner surface of the side cover 700b of the cover member 700.

Here, any one of the reflective coating film and the reflective coating material layer may be formed on the reflector 710. The reflector 710 is capable of reflecting the light generated by the light source 110 toward the optical system 600.

The cover member 700 is disposed to contact with the optical system 600. A portion of the cover member 700 may contact with the optical system 600, and the other portions may be disposed apart from the optical system 600 by a predetermined distance.

In some cases, the entire surface of the cover member 700, which faces the optical system 600, may contact with the optical system 600.

Also, the entire surface of the cover member 700, which faces the optical system 600, may be disposed apart from the optical system 600 by a predetermined distance.

For the purpose of providing an overall uniform luminance, the arrangement distance between the cover member 700 and the optical system 600 may be changed according to the safety conditions of the vehicle lamp.

As such, according to the embodiment, a plurality of the light sources having different arrangement directions from the already set reference direction, and a light mixing area is formed in an empty space between the light source and an optical system. Accordingly, the surface light source is implemented by means of a small number of the light sources and can be applied to the vehicle lamp.

Here, the surface light source refers to a light source which diffuses light in the shape of a surface. In the embodiment, it is possible to provide the lamp unit capable of not only satisfying light intensity conditions emitted in a particular direction but also implementing the surface light source by means of a small number of the light sources.

Also, in the embodiment, since the plurality of the light sources are disposed on the flexible substrate, the embodiment can be applied to the vehicle lamp shape having a curvature.

Therefore, the embodiment is able to improve the economical efficiency and design flexibility of the lamp unit for the vehicle.

Figure 37:
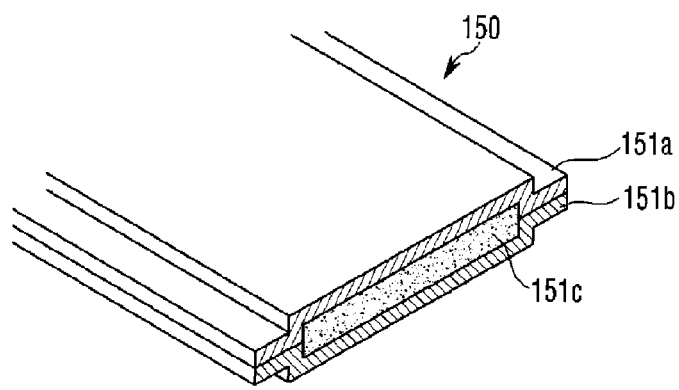
FIG. 37 is a view showing a cross section of FPCB employed to the lamp unit shown in FIG. 1.

FIG. 37 is a view showing a cross section of FPCB employed to the lamp unit shown in FIG. 1.

Referring to FIG. 37, the FPCB 150' may include heat-resistant double resin layers 151a and 151b and a copper layer 151c. In more detail, in the FPCB 150', the copper layer 151c is formed in some areas between the heat-resistant double resin layers 151a and 151b. The copper layer 151c is patterned through an etching process, so that circuit patterns for applying electric current to drive the light source 110 can be formed. Due to the above-mentioned configuration, though the supporting portion 120 in which the copper layer has been formed is not flexible, the connecting portion 130 consisting of only the heat-resistant resin layer is flexible, and thus, the substrate 150 can be flexible. Accordingly, the substrate 150 of the light source module can be applied to a curved surface having a curvature.

That is, through the embodiment, first, by using the plurality of the light sources having different arrangement directions from the reference direction, it is possible to implement the surface light source by means of a small number of the light sources.

Secondly, without using a light guide plate between the light source and the optical system, the light mixing area is formed in an empty space between the light source and the optical system, thereby causing the lamp unit to be lighter and to have a low unit cost.

Thirdly, the plurality of the light sources are disposed on the flexible substrate, so that the lamp unit can be applied to an object which has a curvature and is mounted thereto.

Accordingly, the economical efficiency and design flexibility of the lamp unit can be improved.

This application is related to U.S. patent application Ser. No. 13/684,708, whose entire disclosure is incorporated by reference.

The features, structures and effects and the like described in the embodiments are included in at least one embodiment and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the embodiments.

Although the embodiments were described above, these are just examples and do not limit the embodiments. Further, the embodiments may be changed and modified in various ways, without departing from the essential features of the embodiments, by those skilled in the art. For example, the components described in detail in the embodiments may be modified. Further, differences due to the modification and application should be construed as being included in the scope and spirit of the embodiments, which is described in the accompanying claims.

What is claimed is:

1. A lamp unit comprising:
a curved substrate; and
a plurality of light sources disposed on the curved substrate,
wherein the curved substrate includes a plurality of supporting portions having a top surface and a bottom surface opposite to the top surface and a plurality of connecting portions having a top surface and a bottom surface opposite to the top surface for connecting the supporting portions,
wherein the supporting portion is disposed corresponding to the light sources respectively,
wherein the connecting portion is disposed between the supporting portions,
wherein the supporting portion is formed of a hard and unbendable material,
wherein the connecting portion is formed of a flexible and bendable material,
wherein the top surface of the connecting portion includes an unevenness pattern for reflecting light generated from the light source,
wherein the connecting portion includes a conductor electrically connected to the light sources,
wherein a position of a lowest portion of the unevenness pattern is lower than a-the top surface of the supporting portion, and
wherein angles formed by a reference line and normal lines to a surface of the supporting portion are different from one another,
wherein at least two light sources have a different light intensity.

2. The lamp unit of claim 1,
wherein the supporting portion includes a first surface facing the light source and a second surface disposed on an opposite side of the first surface,
wherein a reflector is disposed on the first surface, and
wherein a plurality of heat radiating fins are disposed on the second surface.

3. The lamp unit of claim 2,
wherein the supporting portion includes unevenness pattern disposed on the first surface.

4. The lamp unit of claim 1,
wherein the supporting portion has a first thickness t1, and the connecting portion has a second thickness t2,
wherein the first thickness t1 is greater than the second thickness t2,
wherein the supporting portion has a first width W1, and the connecting portion has a second width W2, and
wherein the width W2 of the connecting portion is less than the width W1 of the supporting portion.

5. The lamp unit of claim 1,
wherein the lamp unit includes a lens surrounding the light source, and
wherein the lens includes a recess disposed on a position corresponding to a central area of a light emitting surface of the light source.

6. The lamp unit of claim 1, comprising:
an optical member disposed apart from the substrate,
wherein the optical member includes a lower surface facing the light source and a upper surface disposed on an opposite side of the lower surface,
wherein the optical member includes a unevenness pattern disposed on the upper surface of the optical member.

7. The lamp unit of claim 6,
wherein the lower surface of the optical member includes a reflector disposed on a position corresponding to the light source.

8. The lamp unit of claim 6,
wherein the optical member includes at least two inclined surfaces having at least one inflection point.

9. The lamp unit of claim 1,
wherein a thickness of the connecting portion, which is farther from the supporting portion, is less than a thickness of the connecting portion, which is adjacent to the supporting portion.

10. A vehicle including a plurality of lamp units,
wherein the lamp unit comprises: a curved substrate; and
a plurality of light sources disposed on the curved substrate,
wherein the curved substrate includes a plurality of supporting portions each having a top surface and an opposing bottom surface and a plurality of connecting portions each having a top surface and an opposing bottom surface for connecting the supporting portions, wherein the supporting portion is disposed corresponding to the light sources respectively, wherein the connecting portion is disposed between the supporting portions, wherein the connecting portion is formed of a flexible and bendable material, wherein the top surface of the connecting portion includes an unevenness pattern for reflecting light generated from the light source, wherein the connecting portion includes a conductor electrically connected to the light sources, and wherein a position of a lowest portion of the unevenness pattern is lower than the top surface of the supporting portion, wherein the lamp unit displays information on driving conditions of the vehicle.

* * * * *